United States Patent
Ido

(10) Patent No.: US 9,225,877 B2
(45) Date of Patent: Dec. 29, 2015

(54) IMAGE PROCESSING APPARATUS, METHOD FOR PROCESSING IMAGES, AND PROGRAM FOR PERFORMING DENSITY ADJUSTMENTS

(75) Inventor: Yoko Ido, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 13/462,688

(22) Filed: May 2, 2012

(65) Prior Publication Data

US 2012/0287475 A1  Nov. 15, 2012

(30) Foreign Application Priority Data

May 11, 2011  (JP) .................................. 2011-106411

(51) Int. Cl.
   *G03F 3/08*  (2006.01)
   *H04N 1/56*  (2006.01)

(52) U.S. Cl.
   CPC ........................................ *H04N 1/56* (2013.01)

(58) Field of Classification Search
   USPC .......... 358/1.9, 518, 521, 300, 527, 515, 520;
                 345/589, 594, 619, 590, 593; 382/162,
                 382/167, 173; 715/838, 764
   See application file for complete search history.

(56) References Cited

U.S. PATENT DOCUMENTS

2008/0062443 A1*  3/2008  Olson ............................. 358/1.9

FOREIGN PATENT DOCUMENTS

| CN | 101146172 A | 3/2008 |
| JP | 7-221986 A | 8/1995 |
| JP | 2008-134851 A | 6/2008 |
| JP | 2011-061446 A | 3/2011 |

\* cited by examiner

*Primary Examiner* — Barbara Reinier
(74) *Attorney, Agent, or Firm* — Canon USA, Inc., IP Division

(57) ABSTRACT

Density adjustment performed by a user to obtain a desired tint by a density adjustment function has been difficult because of the difficulty in determining which density region of which color needs to be adjusted. An image processing apparatus displays a print preview image corresponding to an image to be printed, causes a user to select a position on the displayed print preview image, and acquires color information of the selected position. The image processing apparatus further determines, from among a plurality of density regions, at least any one of cyan, magenta, yellow, and black density regions corresponding to the acquired color information, and displays an adjustment screen for adjusting a density in the determined density regions.

14 Claims, 22 Drawing Sheets

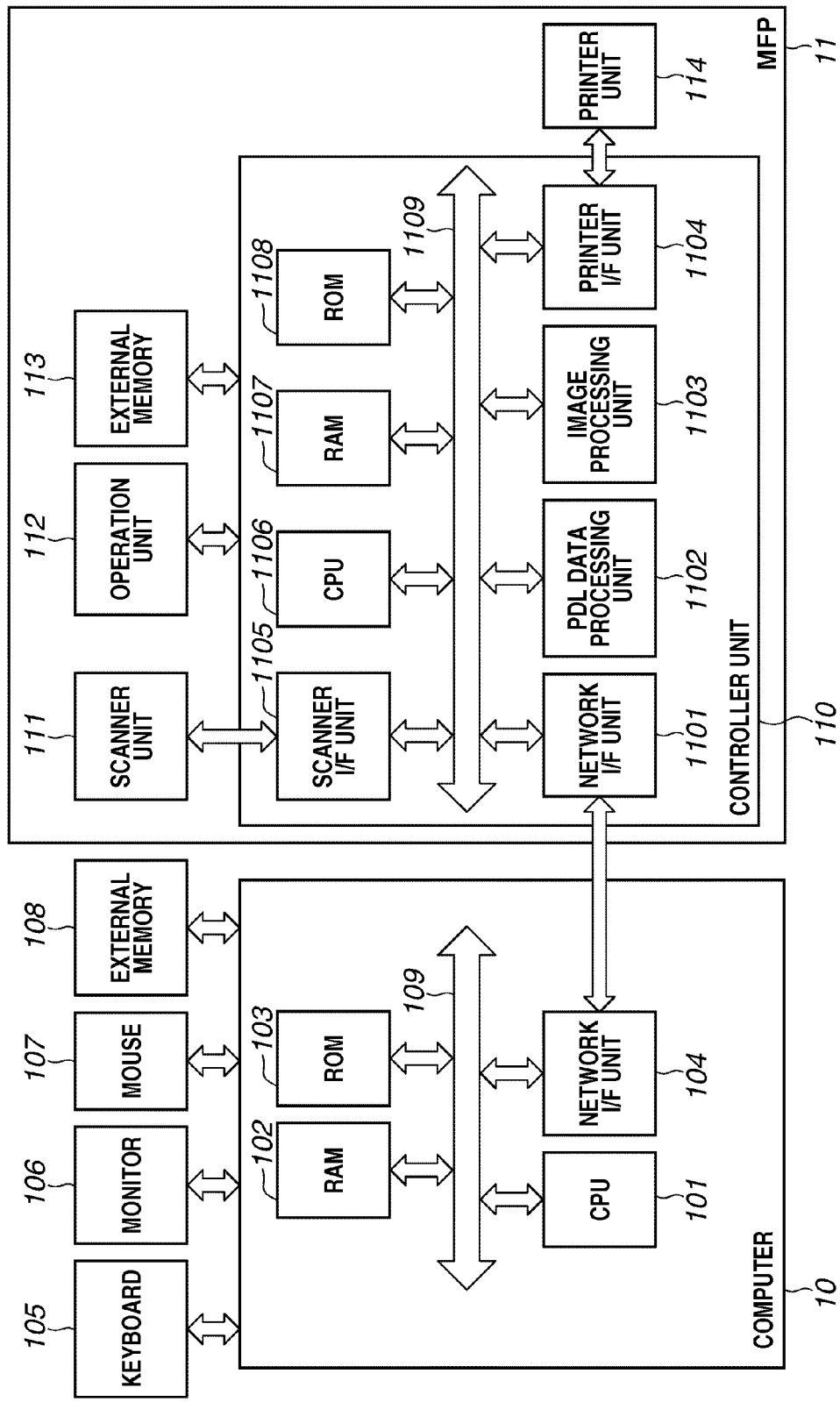

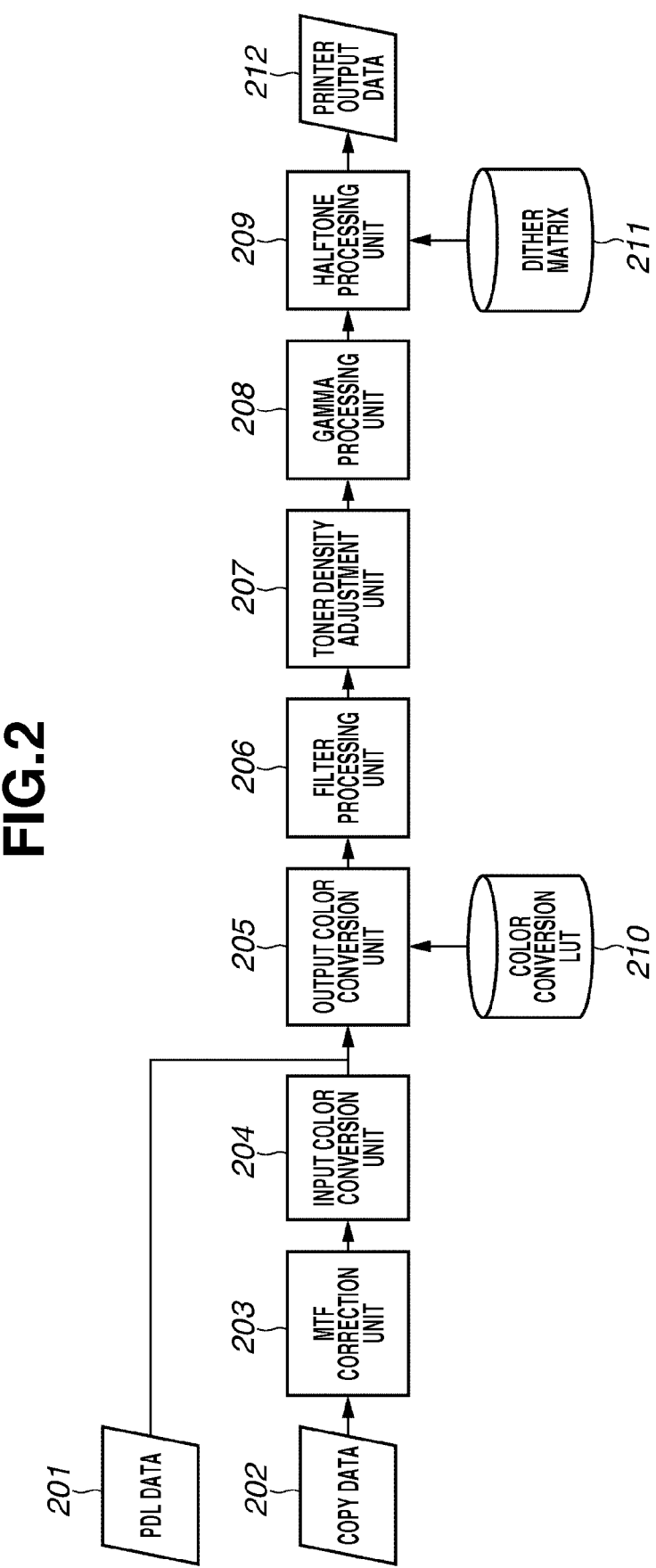

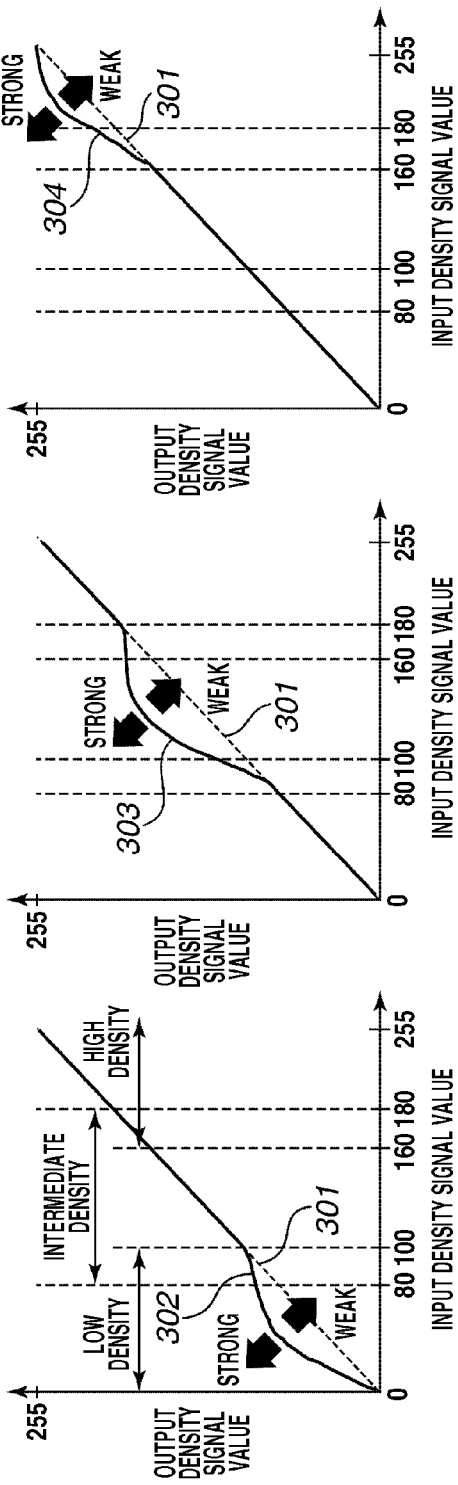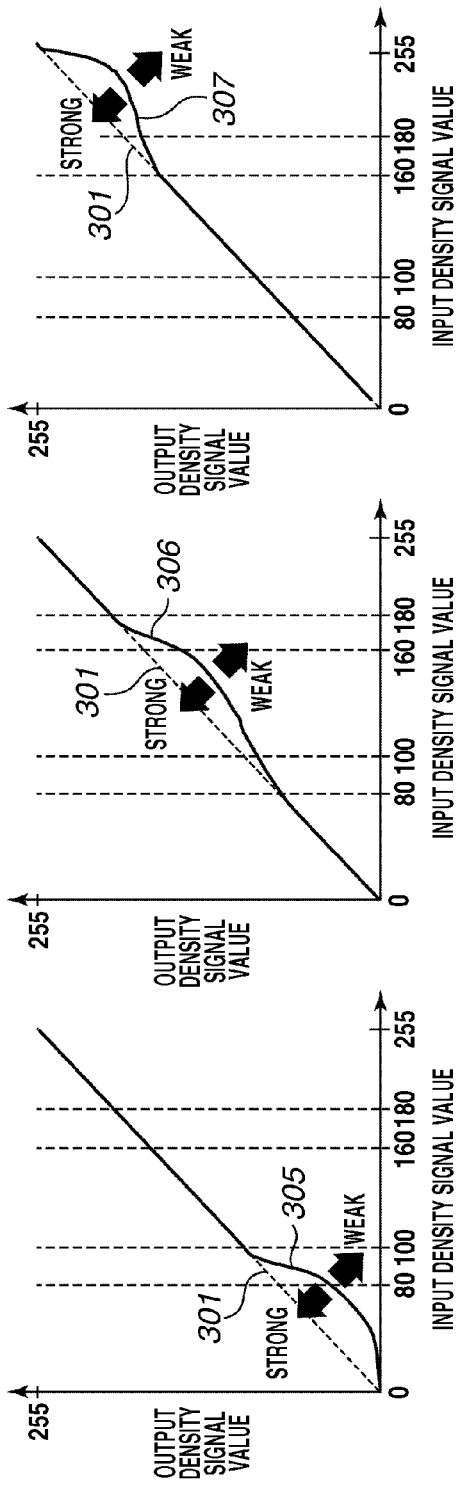

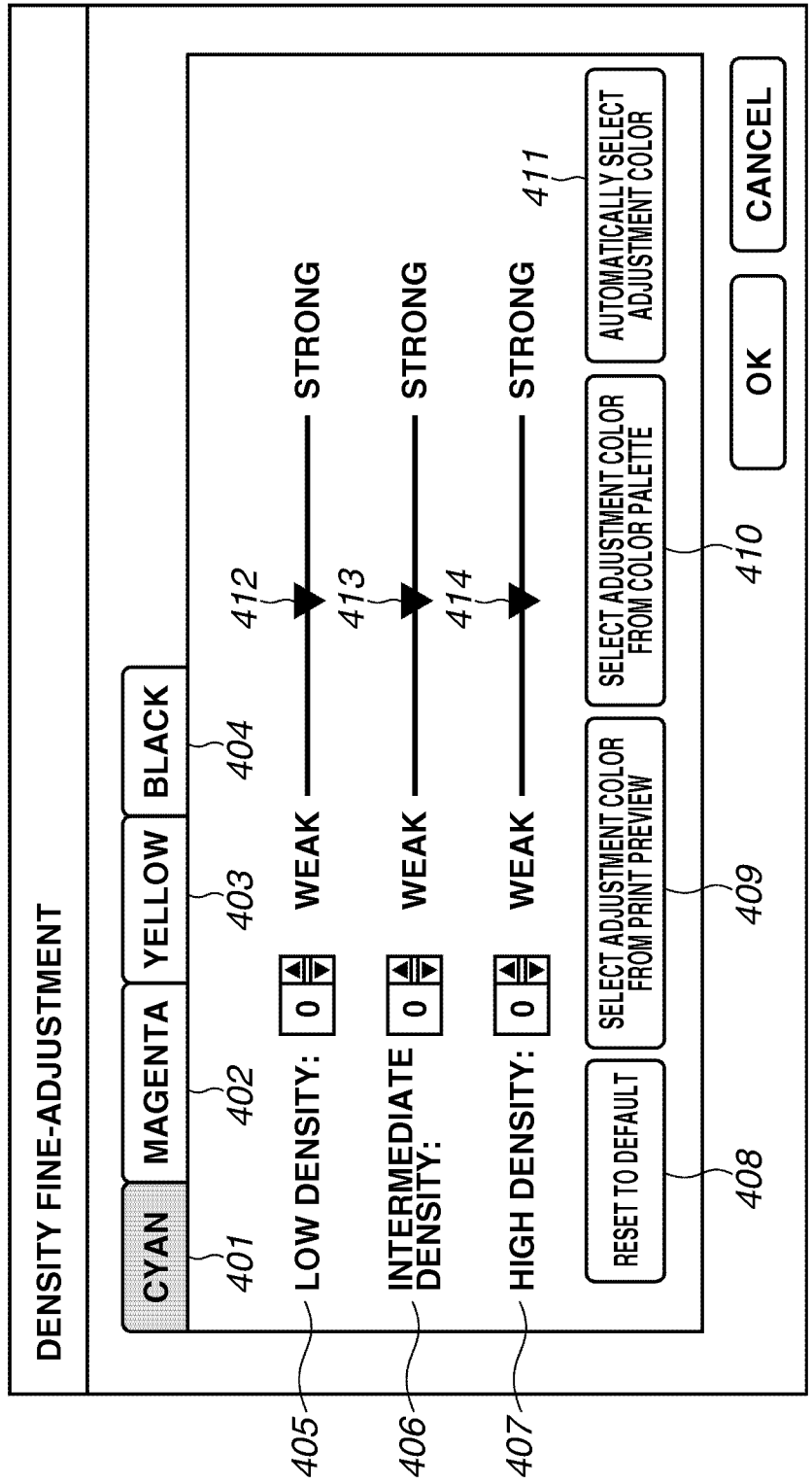

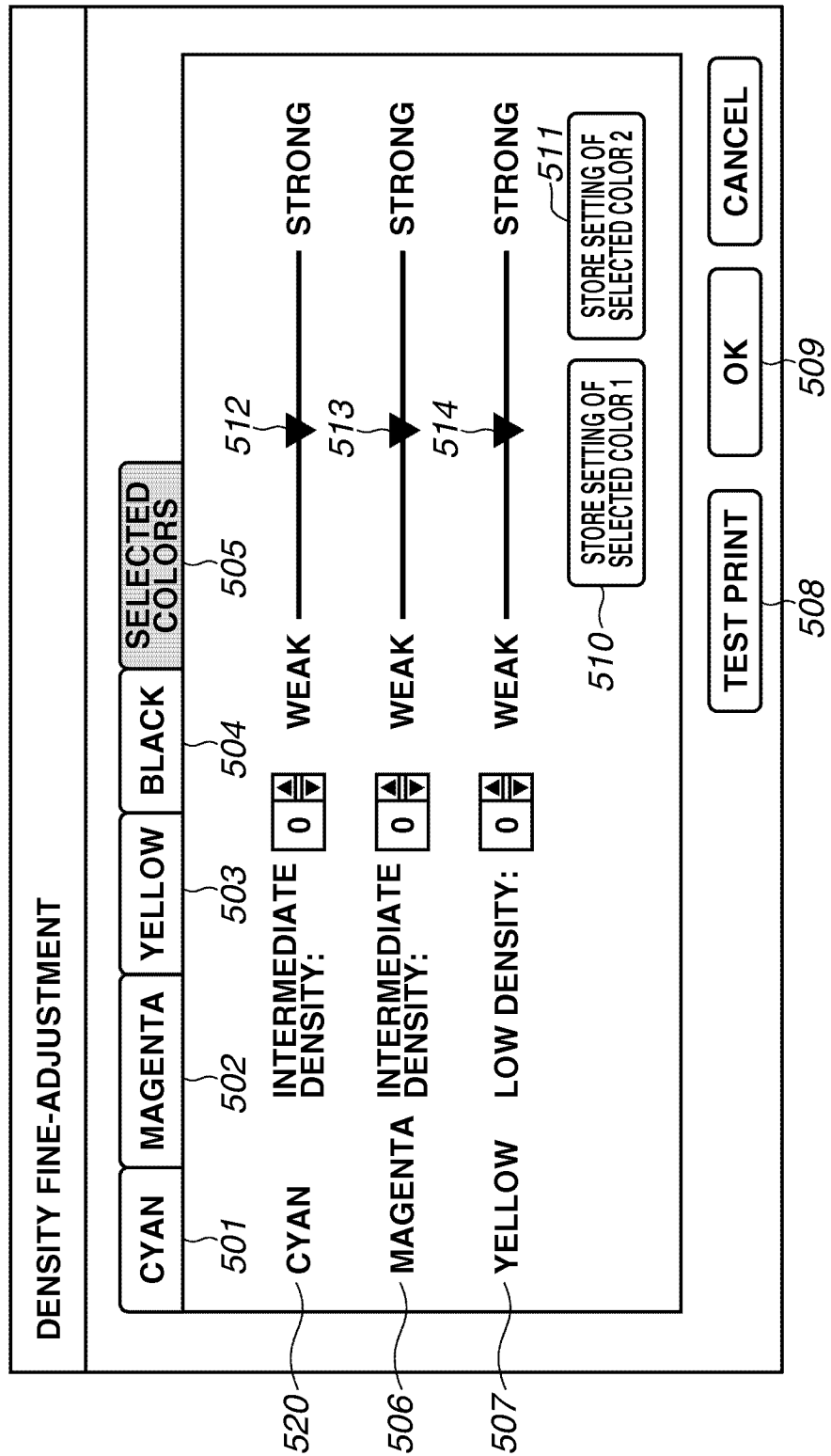

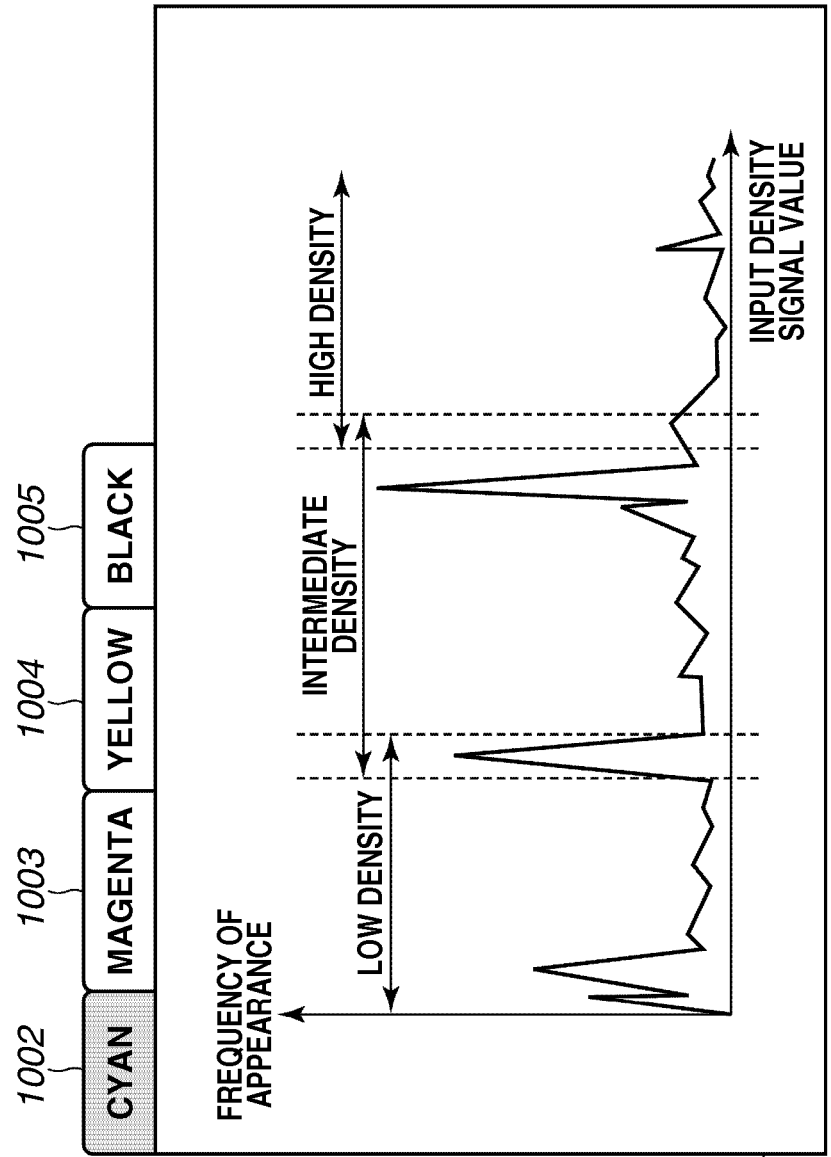
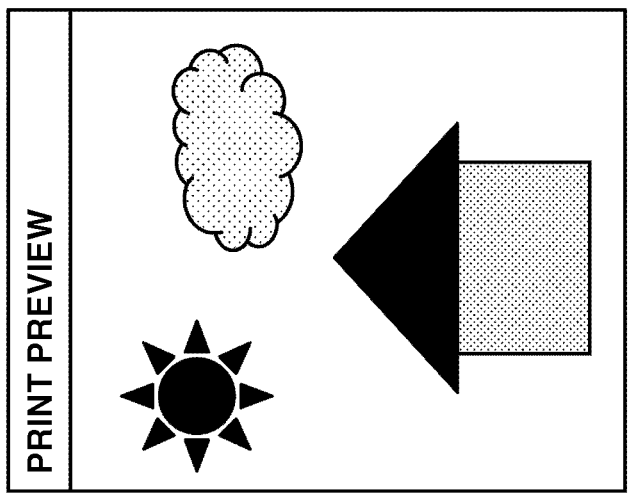
FIG.10A
FIG.10B

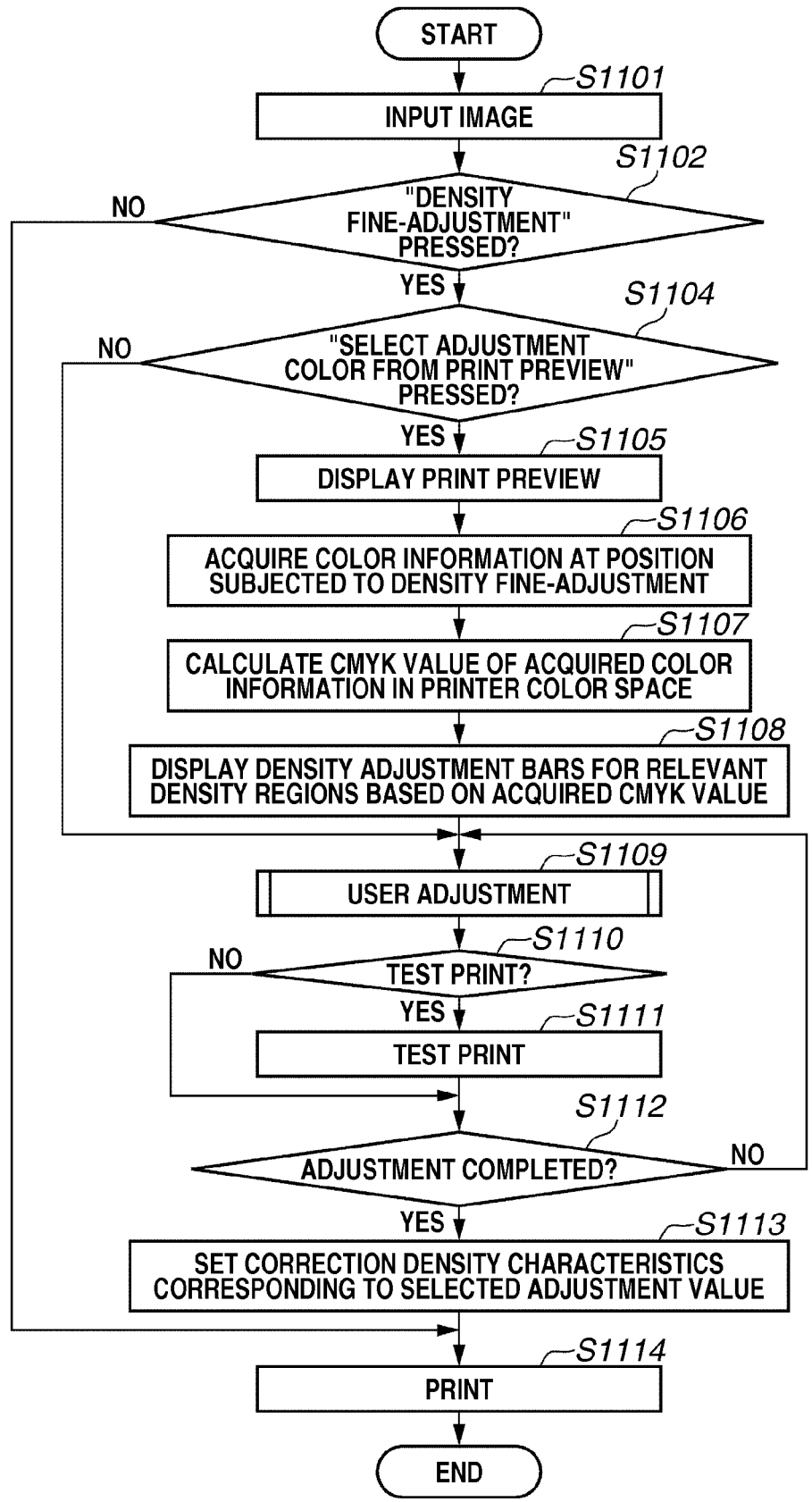

FIG.16A

| NUMBER OF PRESSES OF "VIVID" BUTTON | AMOUNT OF ADJUSTMENT | | | |
|---|---|---|---|---|
| | CYAN | MAGENTA | YELLOW | BLACK |
| 1 | +1 | +1 | +1 | 0 |
| 2 | +2 | +2 | +2 | 0 |
| : | : | : | : | : |
| 8 OR MORE | +8 | +8 | +8 | 0 |

FIG.16B

| NUMBER OF PRESSES OF "FAINT" BUTTON | AMOUNT OF ADJUSTMENT | | | |
|---|---|---|---|---|
| | CYAN | MAGENTA | YELLOW | BLACK |
| 1 | -1 | -1 | -1 | 0 |
| 2 | -2 | -2 | -2 | 0 |
| : | : | : | : | : |
| 8 OR MORE | -8 | -8 | -8 | 0 |

FIG.16C

| NUMBER OF PRESSES OF "BRIGHT" BUTTON | AMOUNT OF ADJUSTMENT | | | |
|---|---|---|---|---|
| | CYAN | MAGENTA | YELLOW | BLACK |
| 1 | 0 | 0 | 0 | -1 |
| 2 | 0 | 0 | 0 | -2 |
| : | : | : | : | : |
| 8 OR MORE | 0 | 0 | 0 | -8 |

FIG.16D

| NUMBER OF PRESSES OF "DARK" BUTTON | AMOUNT OF ADJUSTMENT | | | |
|---|---|---|---|---|
| | CYAN | MAGENTA | YELLOW | BLACK |
| 1 | 0 | 0 | 0 | +1 |
| 2 | 0 | 0 | 0 | +2 |
| : | : | : | : | : |
| 8 OR MORE | 0 | 0 | 0 | +8 |

FIG.16E

| TYPE OF "YELLOWISH" BUTTON | NUMBER OF PRESSES | AMOUNT OF ADJUSTMENT | | | |
|---|---|---|---|---|---|
| | | CYAN | MAGENTA | YELLOW | BLACK |
| − | 1 | 0 | 0 | -1 | 0 |
| − | 2 | 0 | 0 | -2 | 0 |
| − | : | : | : | : | : |
| − | 8 | 0 | 0 | -8 | 0 |
| + | 1 | 0 | 0 | +1 | 0 |
| + | 2 | 0 | 0 | +2 | 0 |
| + | : | : | : | : | : |
| + | 8 | 0 | 0 | +8 | 0 |

FIG.16F

| TYPE OF "REDDISH" BUTTON | NUMBER OF PRESSES | AMOUNT OF ADJUSTMENT | | | |
|---|---|---|---|---|---|
| | | CYAN | MAGENTA | YELLOW | BLACK |
| − | 1 | 0 | -1 | -1 | 0 |
| − | 2 | 0 | -2 | -2 | 0 |
| − | : | : | : | : | : |
| − | 8 | 0 | -8 | -8 | 0 |
| + | 1 | 0 | +1 | +1 | 0 |
| + | 2 | 0 | +2 | +2 | 0 |
| + | : | : | : | : | : |
| + | 8 | 0 | +8 | +8 | 0 |

FIG.16G

| NUMBER OF PRESSES OF "FAIR SKIN" BUTTON | AMOUNT OF ADJUSTMENT | | | |
|---|---|---|---|---|
| | CYAN | MAGENTA | YELLOW | BLACK |
| 1 | 0 | -1 | -1 | -1 |
| 2 | 0 | -2 | -2 | -2 |
| : | : | : | : | : |
| 8 OR MORE | 0 | -8 | -8 | -8 |

FIG.16H

| NUMBER OF PRESSES OF "REDDISH SKIN" BUTTON | AMOUNT OF ADJUSTMENT | | | |
|---|---|---|---|---|
| | CYAN | MAGENTA | YELLOW | BLACK |
| 1 | -1 | +2 | +1 | 0 |
| 2 | -2 | +3 | +2 | 0 |
| : | : | : | : | : |
| 8 OR MORE | -8 | +8 | +8 | 0 |

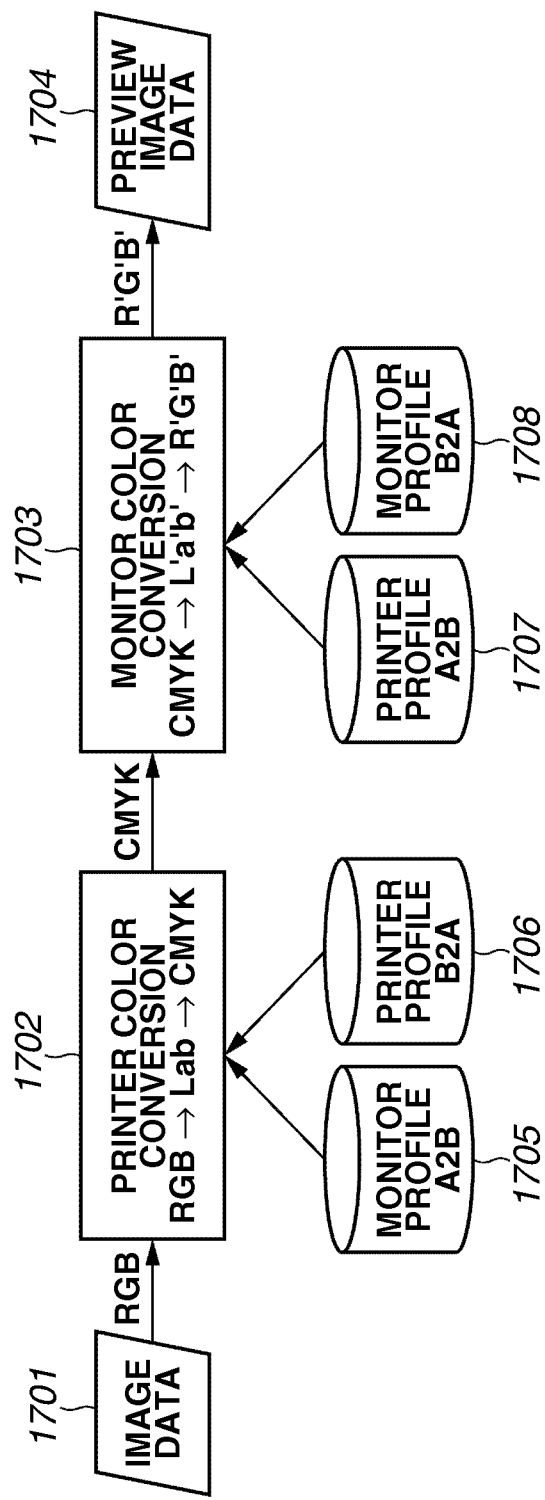

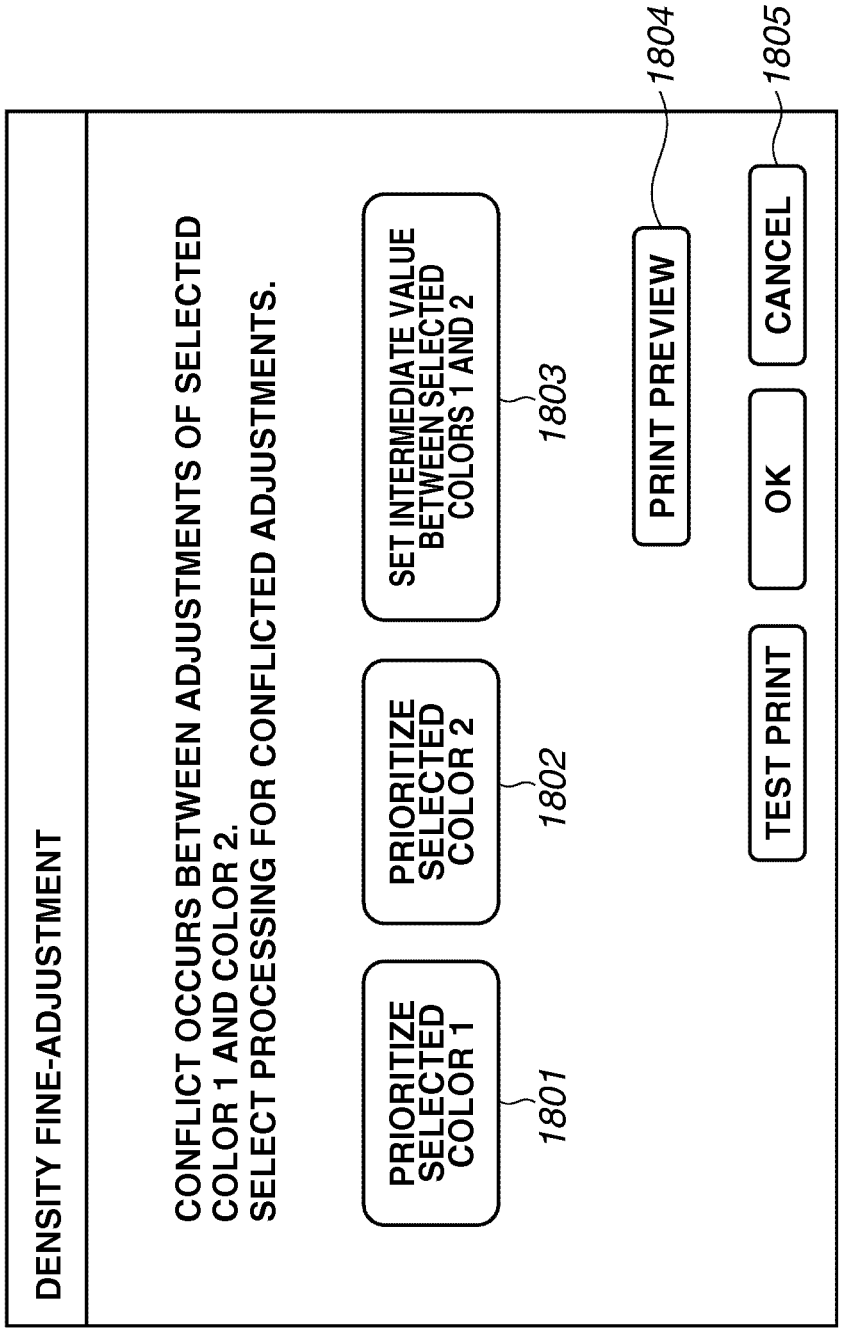

FIG.21

| No. |  | L* || a* || b* ||
|---|---|---|---|---|---|---|---|
|  |  | Min | Max | Min | Max | Min | Max |
| 001 | SKIN COLOR | 70.0 | 90.0 | 0.0 | 20.0 | 5.0 | 20.0 |
| 002 | APPLE RED | 40.0 | 50.0 | 50.0 | 60.0 | 20.0 | 30.0 |
| ⋮ | ⋮ | ⋮ | ⋮ | ⋮ | ⋮ | ⋮ | ⋮ |

IMAGE PROCESSING APPARATUS, METHOD FOR PROCESSING IMAGES, AND PROGRAM FOR PERFORMING DENSITY ADJUSTMENTS

BACKGROUND OF THE INVENTION

1. Field of the Invention

The present invention relates to an image processing apparatus having a density adjustment function, a method for processing an image, and a program therefor.

2. Description of the Related Art

Some electrophotographic printers are provided with a function of adjusting the toner density characteristics for a case where the density characteristics deviate from ideal ones because of aging or durability and a case where a user wants to change the density characteristics. As a density adjustment function, some printers automatically adjust the density to a predetermined gradation target. The density is manually adjusted with some other printers. With manual density adjustment, the inclination of the density characteristics is changed for each of cyan, magenta, yellow, and black (hereinafter referred to as C, M, Y, and K, or simply CMYK). Alternatively, each of the CMYK density regions is classified as low, intermediate, and high density regions, and the density level is independently adjusted for each density region (See Japanese Patent Application Laid-Open No. 7-221986). The technique discussed in Japanese Patent Application Laid-Open No. 7-221986 enables a user to perform density fine-adjustment for each color and density region, providing the user with a high degree of freedom of tint adjustment.

However, in color adjustment by the above-described conventional technique, a user needs to have colorific knowledge and skills to some extent to adjust and obtain a desired tint. For example, to make light pink reddish, it may be difficult for a beginner to determine what colors and density regions need to be adjusted to what extent.

Further, since a monitor screen displays a red-green-blue (RGB) image which is different from a CMYK image actually printed by a printer, the user cannot check actual colors until an image is printed. Therefore, the user needs to repeat adjustment and printing several times until desired colors or densities are attained.

SUMMARY OF THE INVENTION

The present invention is directed to providing a function of assisting a user in performing density adjustment to obtain desired color or density.

According to an aspect of the present invention, an image processing apparatus includes a preview image display unit configured to display a print preview image corresponding to an image to be printed, a selection unit configured to cause a user to select a position subjected to density adjustment on the print preview image displayed by the preview image display unit, an acquisition unit configured to acquire color information of the position selected by the selection unit, a determination unit configured to determine, from among a plurality of density regions, at least anyone of cyan, magenta, yellow, and black density regions corresponding to the color information acquired by the acquisition unit, and an adjustment screen display unit configured to display an adjustment screen for adjusting a density in the density region determined by the determination unit.

According to the present invention, an adjustment screen to be displayed for adjusting density values in a density region corresponding to a selected color can assist a user in performing density adjustment for each density region.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates a configuration of a system including a computer and a multifunction peripheral (MFP) according to an exemplary embodiment of the present invention.

FIG. 2 is a block diagram illustrating print processing according to the exemplary embodiment of the present invention.

FIGS. 3A to 3F illustrate density characteristics after density adjustment by a density adjustment function according to the exemplary embodiment of the present invention.

FIG. 4 illustrates an example of a general user interface (UI) for the density adjustment function.

FIG. 5 illustrates an example of an adjustment UI for the density adjustment function according to the exemplary embodiment of the present invention.

FIGS. 10A and 10B illustrate a histogram of image data.

FIG. 11 is a flowchart illustrating main processing according to a first exemplary embodiment.

FIGS. 16A to 16H illustrate relations between the number of presses of vividness, brightness, and tint adjustment buttons and the amounts of output density adjustment.

FIG. 17 is a block diagram illustrating a processing flow of generating preview image data.

FIG. 18 is an example of a UI to be displayed when conflict occurs between adjustments of selected colors 1 and 2.

FIG. 21 illustrates an example of a memory color list.

DESCRIPTION OF THE EMBODIMENTS

Figure 6:
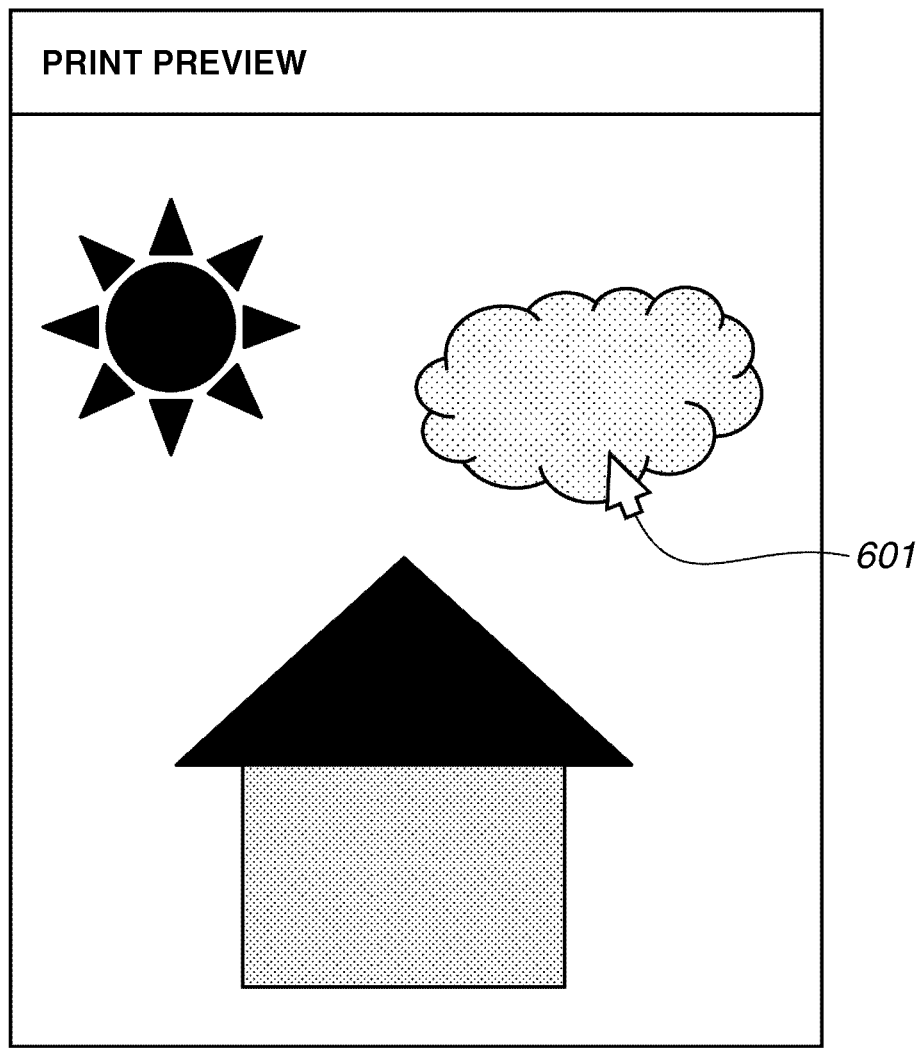
FIG. 6 illustrates an example of a print preview screen used for the density adjustment according to the exemplary embodiment of the present invention.

Various exemplary embodiments, features, and aspects of the invention will be described in detail below with reference to the drawings.

FIG. 1 is a block diagram illustrating a configuration of a printer control system including a computer according to an exemplary embodiment. Unless otherwise described, the present invention is naturally applicable to a single apparatus or a system including a plurality of apparatuses as long as functions of the present invention are implemented. Further, unless otherwise described, the present invention is naturally applicable to a system which performs connection and processing via a network such as a local area network (LAN), a wide area network (WAN), etc. as long as functions of the present invention are implemented.

<System Configuration According to First Exemplary Embodiment>

Referring to FIG. 1, a host computer 10 according to the first exemplary embodiment includes a central processing unit (CPU) 101 which executes processing based on an application program stored in a read-only memory (ROM) 103 or an external memory 108. The CPU 101 totally controls each device connected to a system bus 109. The ROM 103 or the external memory 108 further stores an operating system program (hereinafter referred to as OS) which is a control program for the CPU 101. A random access memory (RAM) 102 serves as a main memory and a work area for the CPU 101. A network interface (I/F) 104 is connected to a network I/F 1101 of a multifunction printer (hereinafter referred to as MFP) 11 to perform processing of controlling communication with the MFP 11.

A keyboard 105 and a mouse 107 are connected to the computer 10 as input devices, and a monitor 106 is connected thereto as an output device. The CPU 101 displays various registered windows based on a command instructed by a mouse cursor (not illustrated) on the monitor 106, and executes various data processing. When a user performs printing, the CPU 101 opens a print setting window to enable the user to make printer settings and set a print processing method for a printer driver including print mode selection.

The MFP 11 includes a controller unit 110, a scanner unit 111, an operation unit 112, an external memory 113, and a printer unit 114. In the controller unit 110, a CPU 1106, based on a control program, outputs an image signal to the printer unit 114 via a printer I/F unit 1104 connected to a system bus 1109. The control program is stored in a ROM 1108 and the external memory 113. The ROM 1108 stores the control program for the CPU 1106.

The CPU 1106 can communicate with the computer 10 via the network I/F unit 1101, and notifying the computer 10 of information in the printer unit 114. A RAM 1107 serves as a main memory and a work area for the CPU 1106.

In the print processing instructed by the computer 10, the computer 10 transmits image data input using the keyboard 105 and the mouse 107 to the controller unit 110 via the network I/F units 104 and 1101. Then, a page description language (PDL) data processing unit 1102 performs PDL interpretation and rendering, an image processing unit 1103 performs image processing for printer output, and the printer unit 114 prints the processed image data.

In the copy processing, the scanner unit 111 scans a document, the image processing unit 1103 performs image processing for printer output via a scanner I/F unit 1105 and the system bus 1109, and the printer unit 114 prints the processed image data.

<Image Processing Unit>

FIG. 2 illustrates processing flows for copying and printing image data which are performed by the image processing unit 1103. The image processing unit 1103 is provided with a block specific for the copy function, and performs processing common to the copy function and PDL print function. The image processing unit 1103 receives the image data from the CPU 1106 via the system bus 1109, processes the image data, and returns the result of processing to the CPU 1106 via the system bus 1109.

In the copy operation, a modulation transfer function (MTF) correction unit 203 corrects the scanning frequency characteristics of multivalued image data (8-bit image data) scanned by an image reader. An input color conversion unit 204 applies to the corrected image data the color space conversion from a reader-specific color space to the common RGB color space. In the present exemplary embodiment, the input color conversion unit 204 performs the color space conversion from the reader color space to the colorimetrical common RGB color space through a predefined 3×3 matrix calculation.

An output color conversion unit 205 applies to the image data that has undergone the color space conversion to the common color space interpolating calculation using a color conversion look-up table (LUT) 210, thus converting the common RGB color space to a printer color space composed of CMYK color components suitable for a printer. The color conversion LUT 210 is a three-dimensional LUT with which each of three red, green, and blue components is divided at appropriate grid point intervals. Each entry of the LUT stores CMYK values having 8-bit accuracy corresponding to a grid point of the LUT. The output color conversion unit 205 performs known interpolation calculation to convert the three-dimensional LUT into image data with CMYK values.

Then, a filter processing unit 206 applies filter processing including product-sum operation to the CMYK image data using a filter coefficient according to user settings. Thus, the CMYK image data to be output can be sharpened or smoothed.

For the image data processed in this way, if necessary, a toner density adjustment unit 207 adjusts the density characteristics based on the user settings, and sets the adjusted density characteristics for each of CMYK colors as a one-dimensional LUT.

Then, a gamma correction processing unit 208 including the one-dimensional LUT corrects the density characteristics. In this case, the LUT is provided with 9-bit accuracy for input and output.

In the last stage, a halftone processing unit 209 converts the gamma-corrected image data into image data having 1-bit pseudo-halftone representation for each of CMYK colors using a dither matrix 211, and transmits the result of processing to a main controller.

The halftone processing unit 209 compares a numerical value in the dither matrix 211 stored in the RAM 1107 with that in the input image data. If the numerical value in the input image data is larger than that in the dither matrix 211, the halftone processing unit 209 outputs 1. Whereas, if the numerical value in the input image data is smaller than that in the dither matrix 211, the halftone processing unit 209 outputs 0. Although, in the present exemplary embodiment, screen processing is based on 1-bit output for the convenience of description, the number of output bits is not limited to 1 bit.

The halftone processing unit 209 can switch between a plurality of dither matrices 211 based on an instruction from the CPU 1106. The image processing unit 1103 returns the processed data (printer output data 212) to the CPU 1106.

At the time of the copy function operation, the image processing unit 1103 receives image data scanned by the scanner unit 111 via the scanner I/F unit 1105, and processes the image data. At the time of the PDL function operation, since the MTF correction unit 203 and the input color conversion unit 204 are not necessary, the CPU 1106 skips the relevant processing and performs the processing from the output color conversion unit 205.

The image processing unit 1103 returns the printer output data 212 to the CPU 1106, and the CPU 1106 eventually transmits the printer output data 212 to the printer unit 114.

<Density Adjustment>

Example processing performed by the toner density adjustment unit 207 will be described below with reference to FIGS. 3A to 3F and FIG. 4.

FIGS. 3A to 3F illustrate the density characteristics before and after density adjustment for a certain color. Regularly, the toner density adjustment unit 207 performs color conversion based on the linear density characteristics 301. However, the user can adjust the density characteristics as desired for each color and density region by giving an instruction via an adjustment user interface (UI) as illustrated in FIG. 4 with use of the operation unit 112 and input devices such as the keyboard 105 and the mouse 107.

FIG. 4 illustrates an example of the adjustment UI displayed on the monitor 106 and the operation unit 112. As illustrated in FIG. 4, the adjustment UI includes a CYAN tab 401, a MAGENTA tab 402, a YELLOW tab 403, and a BLACK tab 404 corresponding to adjustment screens for respective colors. FIG. 4 illustrates an adjustment screen for cyan. Referring to FIG. 4, for a low density region 405, an intermediate density region 406, and a high density region 407 of cyan, the user can select an appropriate level from among several adjustment levels between "WEAK" and "STRONG" by output density adjustment bars 412, 413, and 414, respectively.

Referring to FIGS. 3A to 3F, the input density signal value axis is divided into three regions, i.e., low, intermediate, and high density regions. The input/output density signal value is represented by 8 bits. The low density region ranges from 0 to 100, the intermediate density region ranges from 80 to 180, and the high density region ranges from 160 to 255. Thus, the three density regions are partially overlapped with each other to prevent each gradation from becoming discontinuous when independently set adjustment amounts are combined. The number of divisions of the input density signal value axis and the range of each density region are not limited to the above-described example.

FIG. 3A illustrates density characteristics 302 when the user adjusts the output density adjustment bar 412 for the low density region 405 toward "STRONG." FIG. 3B illustrates density characteristics 305 when the user adjusts the output density adjustment bar 412 for the low density region 405 toward "WEAK."

Likewise, FIG. 3C illustrates density characteristics 303 when the user adjusts the output density adjustment bar 413 for the intermediate density region 406 toward "STRONG." FIG. 3D illustrates density characteristics 306 when the user adjusts the output density adjustment bar 413 for the intermediate density region 406 toward "WEAK."

FIG. 3E illustrates density characteristics 304 when the user adjusts the output density adjustment bar 414 for the high density region 407 toward "STRONG." FIG. 3F illustrates density characteristics 307 when the user adjusts the output density adjustment bar 414 for the high density region 407 toward "WEAK."

The above-described adjustments are applied to each of C, M, Y, and K colors. The toner density adjustment unit 207 applies the resultant density characteristics to an image to be output. There are eight adjustment levels in both directions "STRONG" and "WEAK." The larger the adjustment level, the larger the adjustment curve. The closer to zero the adjustment level, the closer to a linear state the adjustment curve.

In FIG. 4, when a user presses a "RESET TO DEFAULT" button 408, the output density adjustment bars 412, 413, and 414 are returned to the default state.

<Main Processing>

Features of the present invention will be described below with reference to a flowchart illustrated in FIG. 11. When the computer 10 executes processing illustrated in the flowchart in FIG. 11, the CPU 101 loads a program for executing each step in the flowchart in FIG. 11 stored in the ROM 103 or the external memory 108 into the RAM 102. Then the CPU 101 executes the loaded program, and thus the processing in the flowchart in FIG. 11 is implemented.

When the MFP 11 executes the processing illustrated in the flowchart in FIG. 11, the CPU 1106 loads a program for executing each step in the flowchart in FIG. 11 stored in the ROM 1108 or the external memory 113 into the RAM 1107. Then the CPU 1106 executes the loaded program, and thus the processing in the flowchart in FIG. 11 is implemented.

Although the following descriptions are based on a case where the user performs density fine-adjustment using input/output devices (the keyboard 105, the monitor 106, and the mouse 107) connected to the computer 10, similar processing is applied when the user performs density fine-adjustment using the operation unit 112 of the MFP 11.

In step S1101, image data specified to be output by a user (an image to be printed) is input to the computer 10 via an application or a printer driver. Example of the input image data is application data generated by image editing software and Office document editing software.

In step S1102, the computer 10 determines whether the user presses a "DENSITY FINE-ADJUSTMENT" button in a printer driver screen displayed at the time of printing. If the user presses the "DENSITY FINE-ADJUSTMENT" button (YES in step S1102), the processing proceeds to step S1104. Whereas, if the user prints the image without pressing the button (NO in step S1102), the processing proceeds to step S1114.

In step S1104, the computer 10 determines whether the user presses a "SELECT ADJUSTMENT COLOR FROM PRINT PREVIEW" button 409. If the user presses the "SELECT ADJUSTMENT COLOR FROM PRINT PREVIEW" button 409 (YES in step S1104), then the processing proceeds to step S1105. Whereas, if the user does not press the "SELECT ADJUSTMENT COLOR FROM PRINT PREVIEW" button 409 (NO in step S1104), the processing proceeds to step S1109. In step S1105, the computer 10 displays on the monitor 106 a print preview image corresponding to the image to be printed as illustrated in FIG. 6.

Processing for generating a preview image through color matching with use of an icc profile will be described in detail below with reference to FIG. 17. It is supposed that the image data is RGB data in the color space of the monitor 106.

In printer color conversion 1702, the computer 10 converts RGB image data 1701 into a color space of the printer unit 114. More specifically, using an A2B table 1705 in a monitor profile of the monitor 106 and a B2A table 1706 in a printer profile, the computer 10 applies to the RGB image data 1701 gamut mapping onto the CMYK space of the printer unit 114 via the device-independent L*a*b* color space. Then, in monitor color conversion 1703, using an A2B table 1707 in the printer profile and a B2A table 1708 in the monitor profile, the computer 10 applies to the image data (converted into CMYK data) the color space conversion to the RGB space of the monitor 106 for preview image checking via the device-independent L*a*b* color space. Thus, the user can check on the monitor 106 an output preview image 1704 for the printer unit 114.

In step S1106, the user specifies a position subjected to density fine-adjustment on the output preview image data 1704 using the mouse 107, and the computer 10 acquires positional information and color information at the specified point. In this case, the computer 10 acquires RGB (R, G, and B) values at a position on the preview image pointed by a pointer 601 using the mouse 107.

In step S1107, the computer 10 calculates CMYK values in the printer color space corresponding to the RGB values acquired in step S1106. The method for calculating CMYK values is similar to that applied in the printer color conversion 1702 described above with reference to FIG. 17.

In step S1108, for each of C, M, Y, and K values calculated in step S1107, the computer 10 determines density regions from among a plurality of density regions to determine output density adjustment bars to be displayed in the adjustment UI on the monitor 106. For example, when the CMYK values calculated from the RGB values selected using the pointer 601 in step S1106 are (C, M, Y, K)=(128, 80, 10, 0), the computer 10 displays a UI (density fine-adjustment screen) as illustrated in FIG. 5. More specifically, since C=128 corresponds to the intermediate density region, M=80 corresponds to the intermediate density region, and Y=10 corresponds to the low density region, the computer 10 displays only an output density adjustment bar for the relevant density region for each of cyan, magenta, and yellow. Since adjustment with K=0 causes no change, the computer 10 does not display an output density adjustment bar for black. In addition to the output density adjustment bars for C, M, Y, and K, a "SELECTED COLORS" tab 505 is provided for enabling a user to display output density adjustment bars only for a selected color in a limited way. FIG. 5 illustrates a state where the "SELECTED COLORS" tab 505 is active.

Although the output density adjustment bars for the density regions corresponding to C, M, Y, and K are displayed in step S1108, output brightness adjustment bars for brightness regions corresponding to R, G, and B may be displayed based on the RGB values acquired in step S1106. More specifically, the computer 10 determines which of the low, intermediate, and high brightness regions each of the RGB values obtained in step S1106 falls into, and displays an adjustment screen for adjusting the brightness in the determined brightness regions.

In the above descriptions, none of the CMYK values falls into overlapped portions between the low, intermediate, and high density regions. However, when any of CMYK values falls into overlapped portions between the low, intermediate, and high density regions, the computer 10 may display an output density adjustment bar for a density region with which the calculated CMYK values is close to the center value of an input signal for the density region. Further, the computer 10 may select output density adjustment bars to be displayed by referring also to CMYK values of pixels around the pixel pointed by the pointer.

In step S1109, the computer 10 receives adjustment which is input by the user via a displayed UI. Processing in this step will be described in detail below.

In step S1110, the computer 10 determines whether the user will perform test print reflecting the contents of density adjustment. The user can input a test print instruction to the computer 10 by pressing a "TEST PRINT" button 508 in the UI illustrated in FIG. 5. If the user presses the "TEST PRINT" button 508 (YES in step S1110), the processing proceeds to step S1111. Whereas, if the user does not press the "TEST PRINT" button 508 (NO in step S1110), the processing proceeds to step S1112.

In step S1111, the computer 10 performs test print. Test print image data is generated with a similar processing flow to the processing illustrated in FIG. 2. For each of C, M, Y, and K, the toner density adjustment unit 207 applies output density adjustment values selected in previous steps to the image data as a one-dimensional LUT having any one of the characteristics illustrated in FIG. 3, thus adjusting the density characteristics. Then, the processing proceeds to step S1112.

In step S1112, after the user has checked the test print, the computer 10 determines whether the density adjustment processing is completed. More specifically, the computer 10 determines whether the user presses an "OK" button 509 on the UI illustrated in FIG. 5. When the computer 10 determines that the density adjustment processing is completed (YES in step S1112), the processing proceeds to step S1113. Whereas, if the computer 10 determines that the density adjustment processing is continued by the user (NO in step S1112), the processing returns to step S1109 to continue the density adjustment processing.

In step S1113, the computer 10 stores a one-dimensional LUT corresponding to the selected output density adjustment values in the RAM 102 or the external memory 108 in the computer 10 as corrected density characteristics. Subsequently, when the user gives a print instruction, any image will be printed with use of the above-described corrected density characteristics. Then, the processing proceeds to step S1114.

In step S1114, the toner density adjustment unit 207 applies density adjustment to the input image data based on the corrected density characteristics set in step S1113. In addition, the gamma correction processing unit 208 and the halftone processing unit 209 applies to the image data gamma correction processing and halftone processing, respectively, the controller unit 110 transmits the image data to the printer unit 114, and the printer unit 114 prints the resultant image.

Although, in the above descriptions, the set density adjustment values are applied to all of subsequent print jobs, the processing is not limited thereto. For example, the set density adjustment values may be applied only to a job at the time of density adjustment and, after completion of the job, the density adjustment values may be reset to default values.

<User Adjustment>

Processing of user adjustment in step S1109 will be described in detail below with reference to FIG. 12.

In step S1201, the computer 10 calculates corrected density characteristics based on adjustment value combinations possible by the output density adjustment bars for the selected color and density regions. For example, when the UI illustrated in FIG. 5 is displayed, the computer 10 prepares a one-dimensional LUT for a total of 4913 adjustment value combinations. (4913=17 intermediate-density adjustment value levels (−8 to +8) of cyan×17 intermediate-density adjustment value levels (−8 to +8) of magenta×17 low-density adjustment value levels (−8 to +8) of yellow).

In step S1202, the computer 10 generates a thumbnail of preview images corresponding to all of the corrected density characteristics obtained in step S1201. The computer 10 performs this processing (preprocessing) so that a preview image can be displayed in real time each time the user performs density adjustment in subsequent steps. The method for generating a preview image is described above with reference to FIG. 17. Then, the processing proceeds to step S1203.

In step S1203, the user performs user adjustment using the output density adjustment bars 512, 513, and 514. In the UI illustrated in FIG. 5, the user can drag each of the output density adjustment bar 512 for an intermediate density region 520 of cyan, the output density adjustment bar 513 for an intermediate density region 506 of magenta, and the output density adjustment bar 514 for an intermediate density region 507 of yellow toward "STRONG" or "WEAK" using the mouse 107, or directly inputs adjustment values. In step S1204, based on the adjustment values adjusted in step S1203, the computer 10 displays a corresponding preview image in real time.

In step S1205, the computer 10 determines whether the user who has checked the preview image presses the "OK" button 509 to determine the adjustment values. If the user presses the "OK" button 509 (YES in step S1205), the computer 10 ends the user adjustment processing. Whereas, if the user does not press the "OK" button 509 (NO in step S1205), the processing returns to step S1203 to continue the user adjustment processing.

<Adjustment of a Plurality of Selected Colors>

Although, in the above-described exemplary embodiment, the user uses one selected color, the present invention is also applicable to a case where the user uses a plurality of selected colors.

For example, suppose a case where a "STORE SETTING OF SELECTED COLOR 1" button 510 and a "STORE SETTING OF SELECTED COLOR 2" button 511 are provided as illustrated in FIG. 5 to perform adjustment for two selected colors. When user adjustment for a selected color 1 is completed, the user presses the "STORE SETTING OF SELECTED COLOR 1" button 510 to store the current setting values of cyan, magenta, yellow, and black. Then, when the user sets a selected color 2 using the pointer 601 again on the preview image illustrated in FIG. 6, the computer 10 displays output density adjustment bars for relevant colors and density regions.

When user adjustment for the selected color 2 is completed, the user presses the "STORE SETTING OF SELECTED COLOR 2" button 511. In this case, the computer 10 determines whether adjustment values for the selected colors 1 and 2 are contradictory. Contradictory adjustment refers to setting positive and negative adjustment values for the same density region of the same color for each selected color. An example case of contradictory adjustment is a case where the adjustment value for the intermediate density region of cyan is set to −2 for the selected color 1 while the adjustment value for the intermediate density region of cyan is set to +4 for the selected color 2.

In such a case, the computer 10 displays a warning UI as illustrated in FIG. 18 on the monitor 106 and prompts a user to select solution by pressing a button. More specifically, the warning UI provides the user with a "PRIORITIZE SELECTED COLOR 1" button 1801, a "PRIORITIZE SELECTED COLOR 2" button 1802, a "SET INTERMEDIATE VALUE BETWEEN SELECTED COLORS 1 AND 2" button 1803, and a "CANCEL" button 1805 for cancelling the settings without doing anything. When the user selects the button 1803, the computer 10 sets the adjustment value for the intermediate density region of cyan to +1 which is obtained by the following formula: ((Adjustment value "−2" for the selected color 1)+(Adjustment value "+4" for the selected color 2))/2.

The warning UI also provides the user with a "PRINT PREVIEW" button 1804 for displaying a preview image to enable the user to check an image to which the thus-corrected adjustment values are applied.

As described above, the present invention is also applicable to a case where a plurality of colors can be selected in step S1106 in FIG. 11.

<Case when Spot Color is Specified>

When the density adjustment function is used, a spot color may be specified for the target image data. More specifically, suppose a case where a user specifies a certain color to output while guaranteeing relevant color values. In such a case, the computer 10 excludes the specified color from the adjustment target by the density adjustment function.

Figure 15:
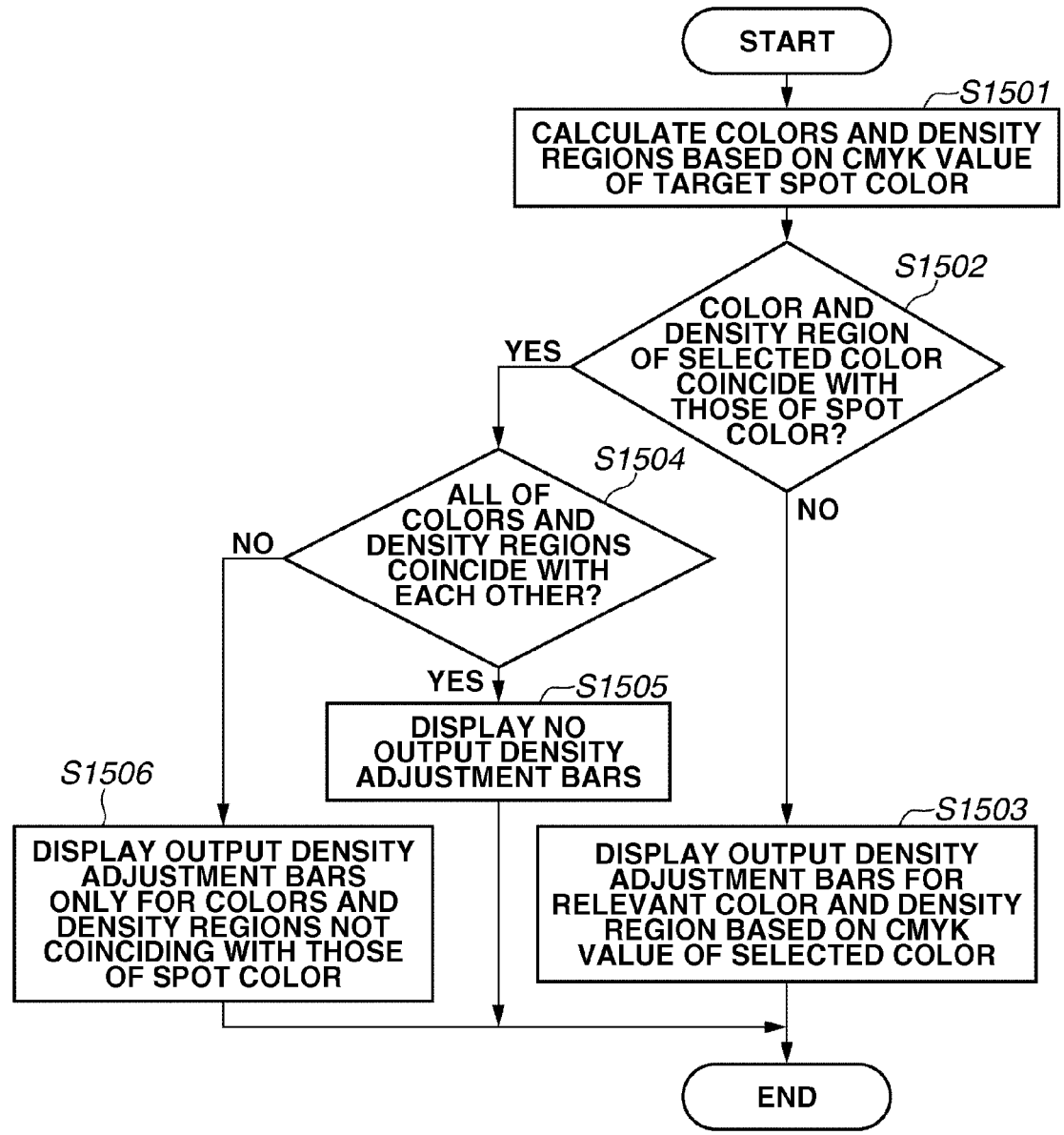
FIG. 15 is a flowchart illustrating exclusive processing at the time of spot color specification in step S1108.

Processing for excluding a specified spot color performed in step S1108 (see FIG. 11) will be described below with reference to FIG. 15.

In step S1501, when a spot color is specified, the computer 10 calculates applicable colors and density regions based on CMYK values of the spot color. The CMYK values can be calculated based on a spot color profile.

In step S1502, the computer 10 determines whether the colors and the density regions included in a selected color coincide with those included in the spot color. If the colors and the density regions included in the selected color do not coincide with those included in the spot color (NO in step S1502), the processing proceeds to step S1503. Whereas, if the colors and the density regions included in the selected color coincide with those included in the spot color (YES in step S1502), the processing proceeds to step S1504.

In step S1503, similar to step S1108 (see FIG. 11), the computer 10 displays on the monitor 106 output density adjustment bars for the relevant colors and density regions based on the CMYK values of the selected color, and ends the processing in this flowchart.

In step S1504, the computer 10 determines whether all of the colors and the density regions included in the selected color coincide with those included in the spot color. If all of the colors and the density regions included in the selected color coincide with those included in the spot color (YES in step S1504), then the processing proceeds to step S1505. In step S1505, the computer 10 does not display the output density adjustment bars corresponding to the selected color, and ends the processing in this flowchart. Whereas, if any one of the colors and the density regions included in the selected color does not coincide with any one included in the spot color (NO in step S1504), the processing proceeds to step S1506. In step S1506, the computer 10 displays only the output density adjustment bars for colors and density regions different from those included in the spot color, and ends the processing in this flowchart.

As described above, the density adjustment function displays on the UI the output density adjustment bars for the colors and densities of a position the user wants to adjust on the preview image, thus assisting user adjustment. Further, the user can perform density adjustment while checking the adjusted preview image, thus saving time, effort, and cost to print.

Although, in the present exemplary embodiment, the computer 10 displays UIs on the monitor 106 connected thereto, the UIs may be displayed on the operation unit 112 of the MFP 11 and the user inputs instructions.

Although, in the present exemplary embodiment, the same density adjustment is applied to the entire image data, whether density adjustment is applied may be determined for each individual object. For example, it is possible that the PDL data processing unit 1102 determines types of objects (images, graphics, and text) included in image data to be output. Then the image processing unit 1103 may apply the density characteristics adjusted by the toner density adjustment unit 207 only to images. It is also possible to provide a "STORE ADJUSTMENT VALUE FOR IMAGE" button, a "STORE ADJUSTMENT VALUE FOR GRAPHICS" button, or the like in the UI illustrated in FIG. 5, and store adjustment values for subsequent application for each individual object.

Figure 7:
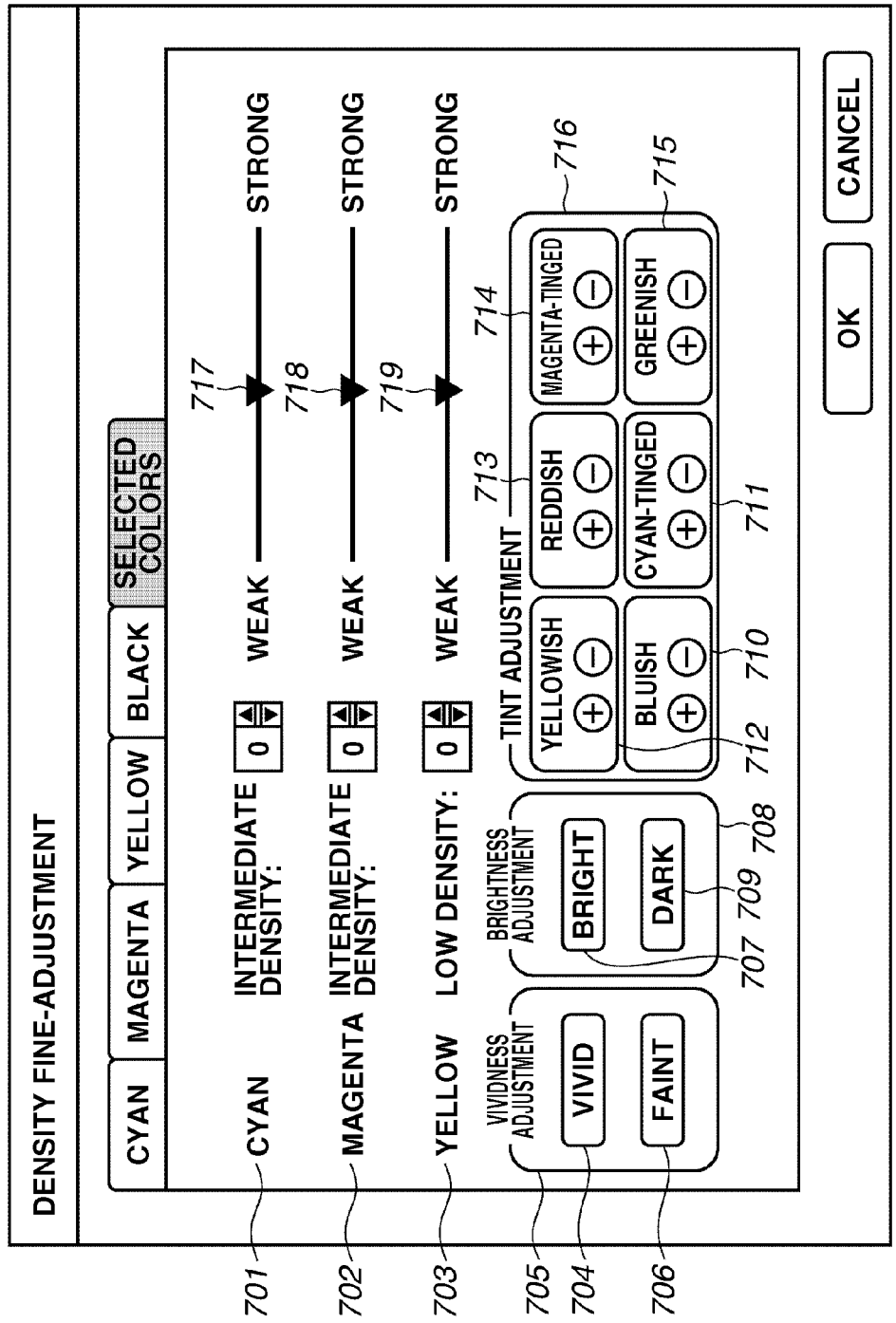
FIG. 7 illustrates an example of an adjustment UI including adjustment buttons for the density adjustment function according to the exemplary embodiment of the present invention.

A second exemplary embodiment will be described below based on a method for enabling a user who is unfamiliar with the density adjustment function to perform density adjustment in a much easier way than in the first exemplary embodiment. Display of only output density adjustment bars to be used in the adjustment in the UI according to the first exemplary embodiment may be difficult to use for a user unfamiliar with achieving a desired tint by adjusting the CMYK densities. For example, to make a certain selected color reddish, such a user does not know which of displayed output density adjustment bars should be adjusted. For this reason, a UI illustrated in FIG. 7 provides some adjustment buttons for vividness adjustment 705, Brightness adjustment 708, and tint adjustment 716 in addition to output density adjustment bars 701, 702, and 703. These adjustment buttons represent the amount of adjustment with such adjectives as "REDDISH", "VIVID", and so on.

Adjustment methods according to the present exemplary embodiment will be described below with reference to FIGS. 7, 11, 12, and 19. Since the present exemplary embodiment differs from the first exemplary embodiment in processing in step S1109 of the flowchart illustrated in FIG. 11, only the processing in step S1109 will be described in detail below.

Figure 12:
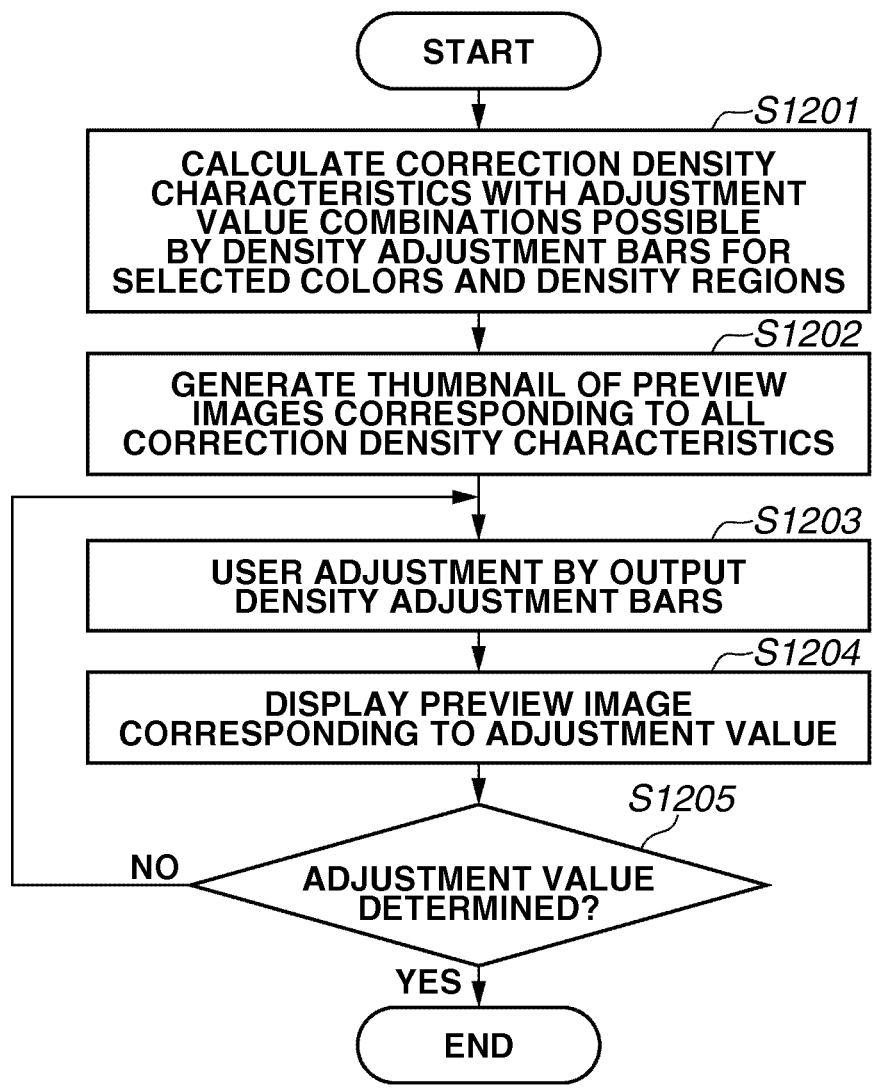
FIG. 12 is a flowchart illustrating in detail user adjustment processing in step S1109.
Figure 19:
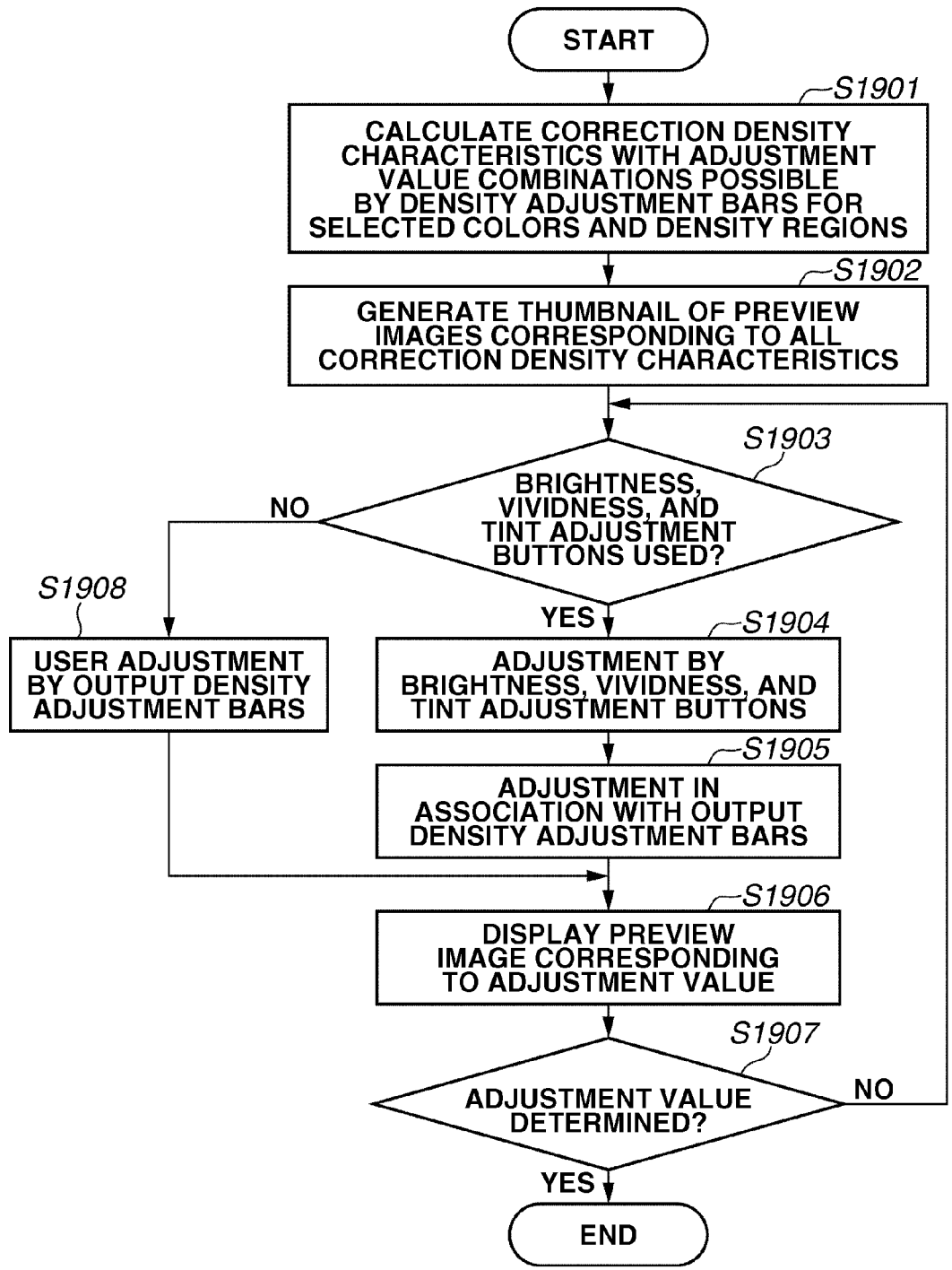
FIG. 19 is a flowchart illustrating in detail user adjustment processing in step S1109 with use of vividness, brightness, and tint adjustment buttons.

Steps S1901 and S1902 illustrated in FIG. 19 are similar to steps S1201 and S1202 in FIG. 12, and thus duplicated descriptions will be omitted. In step S1903, the computer 10 determines whether the user will use the adjustment buttons for the vividness adjustment 705, the brightness adjustment 708, and the tint adjustment 716. When the user will use the adjustment buttons (YES in step S1903), the processing proceeds to step S1904. Whereas, if the user will not use the adjustment buttons (NO in step S1903), the processing proceeds to step S1908. In step S1908, the user performs adjustment using the output density adjustment bars in a similar way to the first exemplary embodiment.

In step S1904, the user performs adjustment using the adjustment buttons for the vividness adjustment 705, the brightness adjustment 708, and the tint adjustment 716. Contents of each adjustment button will be described in detail below. Then, the processing proceeds to step S1905.

In step S1905, the computer 10 adjusts the output density adjustment bars in association with the user adjustment in step S1904. For example, when the user presses a "REDDISH +" button 713 once, an output density adjustment bar 718 for the intermediate density region of magenta and an output density adjustment bar 719 for the low density region of yellow move one step toward "STRONG." According to the number of times that the user presses a "+" or "−" button, the relevant output density adjustment bars accordingly move closer to "STRONG" or "WEAK."

Processing in step S1906 and subsequent steps illustrated in FIG. 19 is similar to the processing in step S1204 and subsequent steps in FIG. 12, and thus duplicated descriptions will be omitted.

<Contents of Tint Adjustment Button>

Contents of the adjustment buttons for the vividness adjustment 705, the brightness adjustment 708, and the tint adjustment 716 will be described below with reference to FIGS. 16A to 16F. FIGS. 16A to 16F illustrate relations between the number of presses of the above-described adjustment buttons and the amount of adjustment for the output density adjustment bars for each color. Each time the user presses once any one of the above-described adjustment buttons, the amount of adjustment for relevant output density adjustment bars increases by one step. When the adjustment button is pressed 8 times, the amount of adjustment will not increase any more.

FIGS. 16A and 16B illustrate the amounts of adjustment to be set to the output density adjustment bars when the user presses the buttons for the vividness adjustment 705. FIG. 16A illustrates the amounts of adjustment for a "VIVID" button 704. FIG. 16B illustrates the amounts of adjustment for a "FAINT" button 706. These two buttons perform adjustment only for C, M, and Y.

FIGS. 16C and 16D illustrate the amounts of adjustment to be set to the output density adjustment bars when the user presses the buttons for the brightness adjustment 708. FIG. 16C illustrates the amounts of adjustment for a "BRIGHT" button 707. FIG. 16D illustrates the amounts of adjustment for a "DARK" button 709. These two buttons perform adjustment only for K.

FIGS. 16E and 16F illustrate the amounts of adjustment to be set to the output density adjustment bars when the user presses the buttons for the tint adjustment 716. FIG. 16E illustrates the amounts of adjustment for "YELLOWISH +" and "YELLOWISH −" buttons 712. FIG. 16F illustrates the amounts of adjustment for "REDDISH +" and "REDDISH −" buttons 713. Pressing the "YELLOWISH +" button 712 makes the image more yellowish. Pressing the "YELLOWISH −" button 712 makes the image less yellowish. These "YELLOWISH" buttons 712 perform adjustment only for Y, and the "REDDISH" buttons 713 perform adjustment only for M and Y.

A color to be adjusted by each of the adjustment buttons for the tint adjustment 716 is as follows.

YELLOWISH: Y
REDDISH: M and Y
MAGENTA-TINGED: M
BLUISH: C and M
CYAN-TINGED: C
GREENISH: C and Y As described above, according to the present exemplary embodiment, these tint adjustment buttons having adjective names on the UI can assist a user unfamiliar with color adjustment using the output density adjustment bars for C, M, Y, and K in performing color adjustment in an easier way.

A third exemplary embodiment will be described below based on a UI which displays a tint adjustment button specialized for a memory color. When the selected color, which is selected in step S1106 in FIG. 11, is included in regions of preset memory colors such as a skin color and a sky color, the computer 10 displays adjustment buttons specialized for the relevant memory color.

Figure 20:
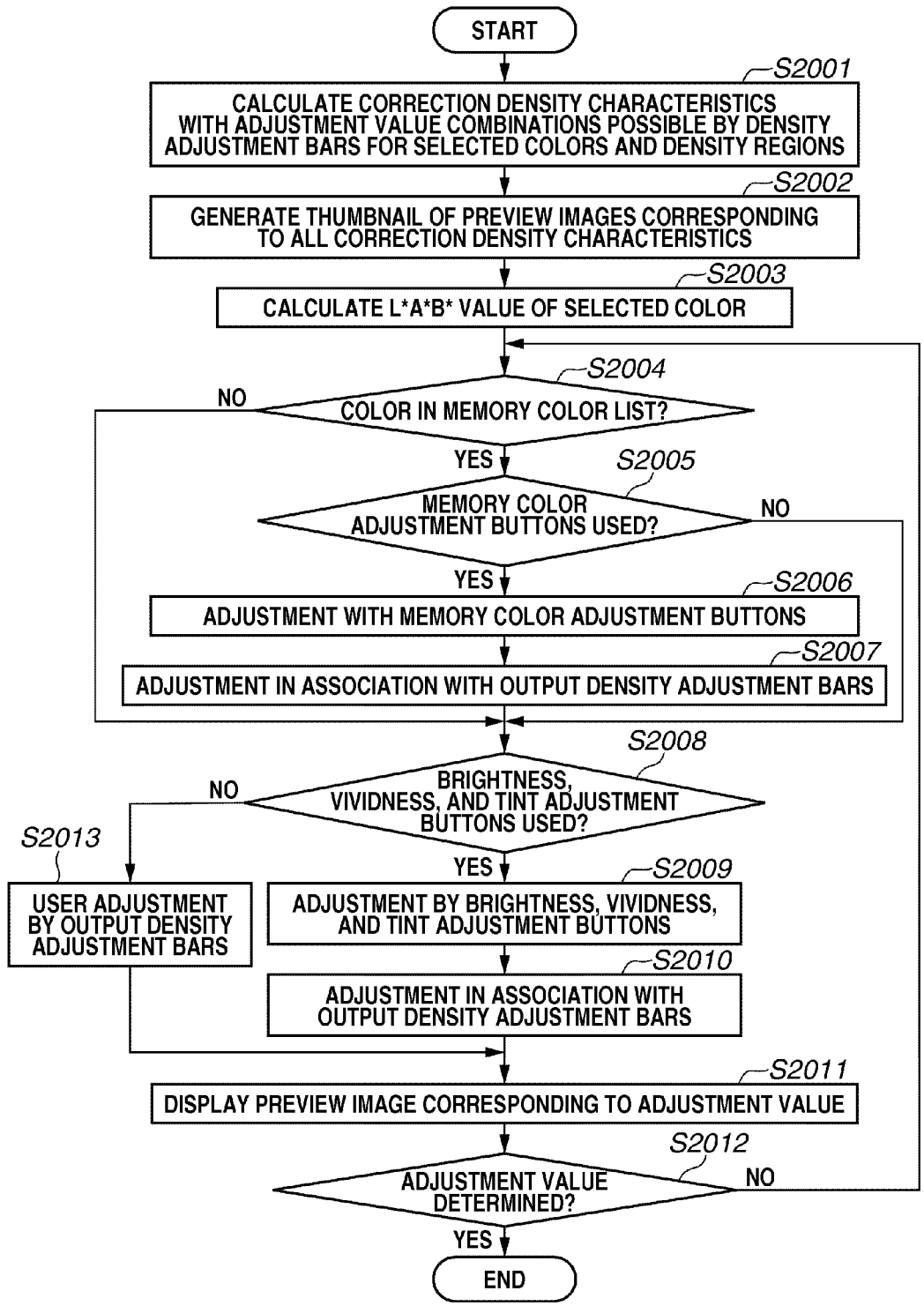
FIG. 20 is a flowchart illustrating in detail user adjustment processing in step S1109 with use of memory color adjustment buttons according to a third exemplary embodiment.

Processing according to the present exemplary embodiment is illustrated in FIG. 20. Here, only processing in steps S2003 to S2007 illustrated in FIG. 20 will be described below which are different from the processing in the second exemplary embodiment in the flowchart illustrated in FIG. 19. The processing in steps S2001, S2002, and S2008 to S2012 illustrated in FIG. 20 are similar to that in steps S1901, S1902, and S1903 to S1907 illustrated in FIG. 19.

In step S2003, the computer 10 calculates L*a*b* values of the selected color with use of the A2B table 1705 in the monitor profile.

In step S2004, the computer 10 refers to a memory color list stored in advance therein and determines whether any memory color registered in the memory color list includes the above-described L*a*b* values.

FIG. 21 illustrates an example of a memory color list. The memory color list stores several types of colors such as a skin color and apple red as the memory colors. Each memory color is registered with color ranges including maximum and minimum values of L*, a*, and b*. The computer 10 determines for each memory color whether the selected color is included in any color range. If a certain memory color includes the selected color (YES in step S2004), the processing proceeds to step S2005. Whereas, if no memory color includes the selected color (NO in step S2004), the processing proceeds to step S2008 to perform similar processing to the second exemplary embodiment.

In step S2005, the computer 10 determines whether the user will perform adjustment using memory color adjustment buttons. If the user will not use the memory color adjustment buttons (NO in step S2005), the processing proceeds to step S2008. Whereas, if the user will use the memory color adjustment buttons (YES in step S2005), the processing proceeds to step S2006. In step S2006, the user performs adjustment using the memory color adjustment buttons.

Figure 8:
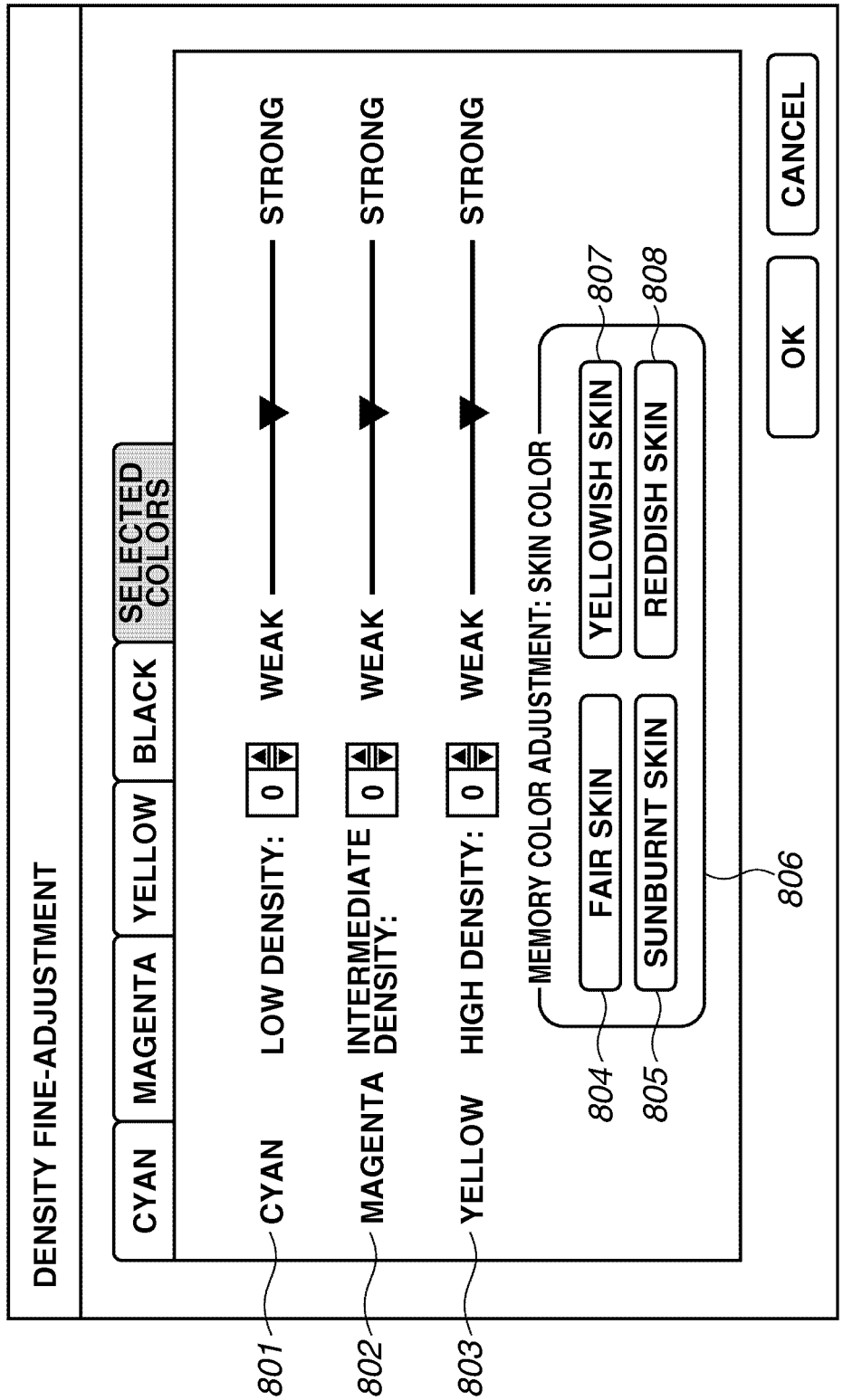
FIG. 8 illustrates an example of an adjustment UI including memory color adjustment buttons for the density adjustment function.

FIG. 8 illustrates an example of a UI displaying adjustment buttons for memory color adjustment 806. In this example, the selected color is included in the skin color range. As adjustment buttons specialized for skin color adjustment, the UI provides a "FAIR SKIN" button 804, a "YELLOWISH SKIN" button 807, a "SUNBURNT SKIN" button 805, and a "REDDISH SKIN" button 808. FIG. 16G illustrates the amounts of adjustment to be set to the output density adjustment bars when the user presses the "FAIR SKIN" button 804. FIG. 16H illustrates the amounts of adjustment to be set to the output density adjustment bars when the user presses the "REDDISH SKIN" button 808. The computer 10 stores C, M, Y, and K adjustment values in advance which can respectively represent the contents of the above-described density adjustment buttons. In step S2007, the computer 10 changes the adjustment values in association with the output density adjustment bars.

Processing in step S2008 and subsequent steps is similar to the processing in step S1903 and subsequent steps illustrated in FIG. 19, and thus duplicated descriptions will be omitted.

According to the above-described present exemplary embodiment, when the selected color corresponds to a preregistered memory color, the adjustment button specialized for the memory color is displayed to assist the user in performing adjustment as intended in an easier way.

In the first, second, and third exemplary embodiments, the user selects a target color from a preview image. A fourth exemplary embodiment will be described below based on a method for selecting a target color from a color palette. The fourth exemplary embodiment is suitable for reliably performing adjustment when RGB values of the target color are known in advance.

Figure 13:
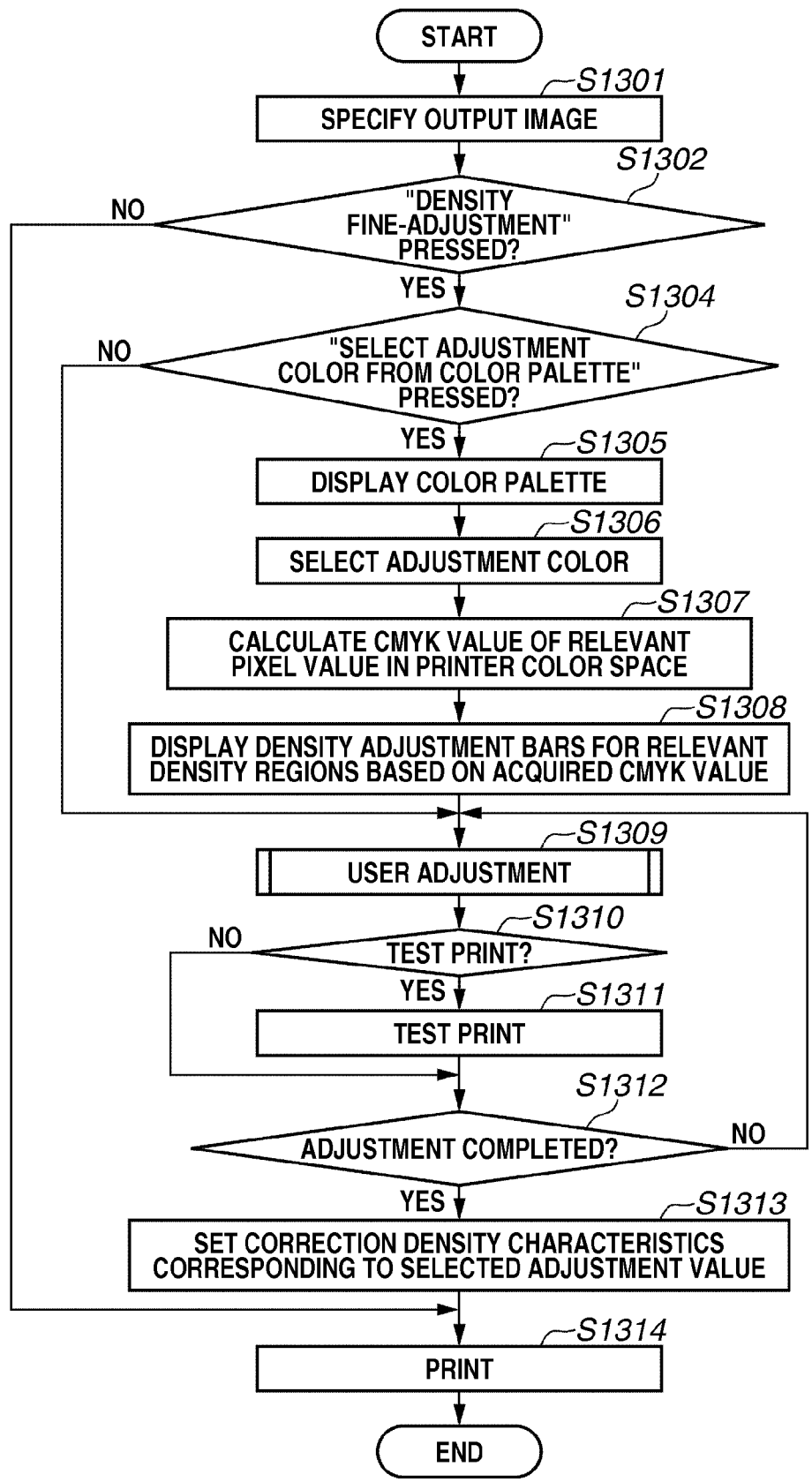
FIG. 13 is a flowchart illustrating main processing of density adjustment using the color palette according to a fourth exemplary embodiment.

Processing according to the present exemplary embodiment is illustrated in FIG. 13. Here, the processing only in steps S1304 to S1306 will be described below which are different from the processing in the first exemplary embodiment in the flowchart illustrated in FIG. 11. The processing in steps S1301, S1302 and S1307 to S1314 illustrated in FIG. 13 are similar to that in steps S1101, S1102, and S1107 to S1114 in FIG. 11.

In step S1304, the computer 10 determines whether the user presses a "SELECT ADJUSTMENT COLOR FROM COLOR PALETTE" button 410 in a UI as illustrated in FIG. 4. If the user presses the "SELECT ADJUSTMENT COLOR FROM COLOR PALETTE" button 410 (YES in step S1304), the processing proceeds to step S1305. Whereas, if the user does not press the "SELECT ADJUSTMENT COLOR FROM COLOR PALETTE" button 410 (NO in step S1304), the processing proceeds to step S1309 to perform user adjustment.

Figure 9:
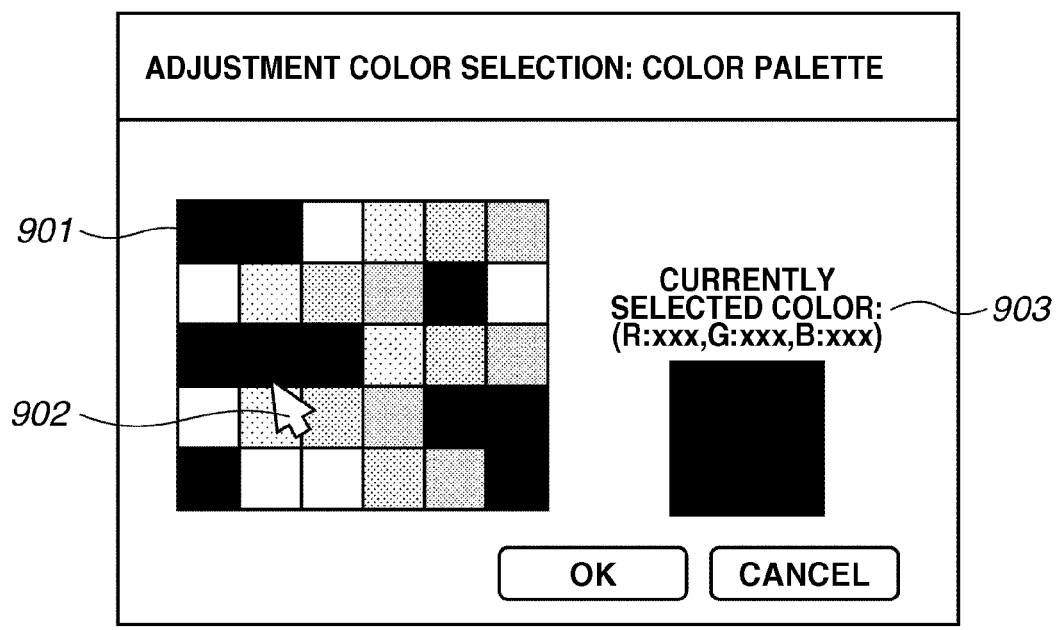
FIG. 9 illustrates an example of a UI for selecting an adjustment color using a color palette.

In step S1305, the computer 10 displays a UI as illustrated in FIG. 9 on the monitor 106. A color palette 901 is represented by, for example, RGB-based 256 color patches.

In step S1306, the user operates the pointer to select a target color from the color palette 901. The color of the selected color patch is displayed as a "CURRENTLY SELECTED COLOR" 903 together with its RGB values. Processing in step S1307 and subsequent steps, namely processing after adjustment color selection, is similar to the processing in step S1107 and subsequent steps in FIG. 11, and thus duplicated descriptions will be omitted.

According to the present exemplary embodiment, when RGB values to be adjusted are known in advance, the user can select the color to be adjusted from the color palette and accordingly reliably apply adjustment to a desired color.

In the first, second, third, and fourth exemplary embodiments, the user selects a color to be adjusted. A fifth exemplary embodiment will be described below based on a method for applying tint adjustment to the entire image. More specifically, a method for converting image data to be printed to a CMYK image, and displaying output density adjustment bars for colors and density regions having high frequencies of appearance.

Figure 14:
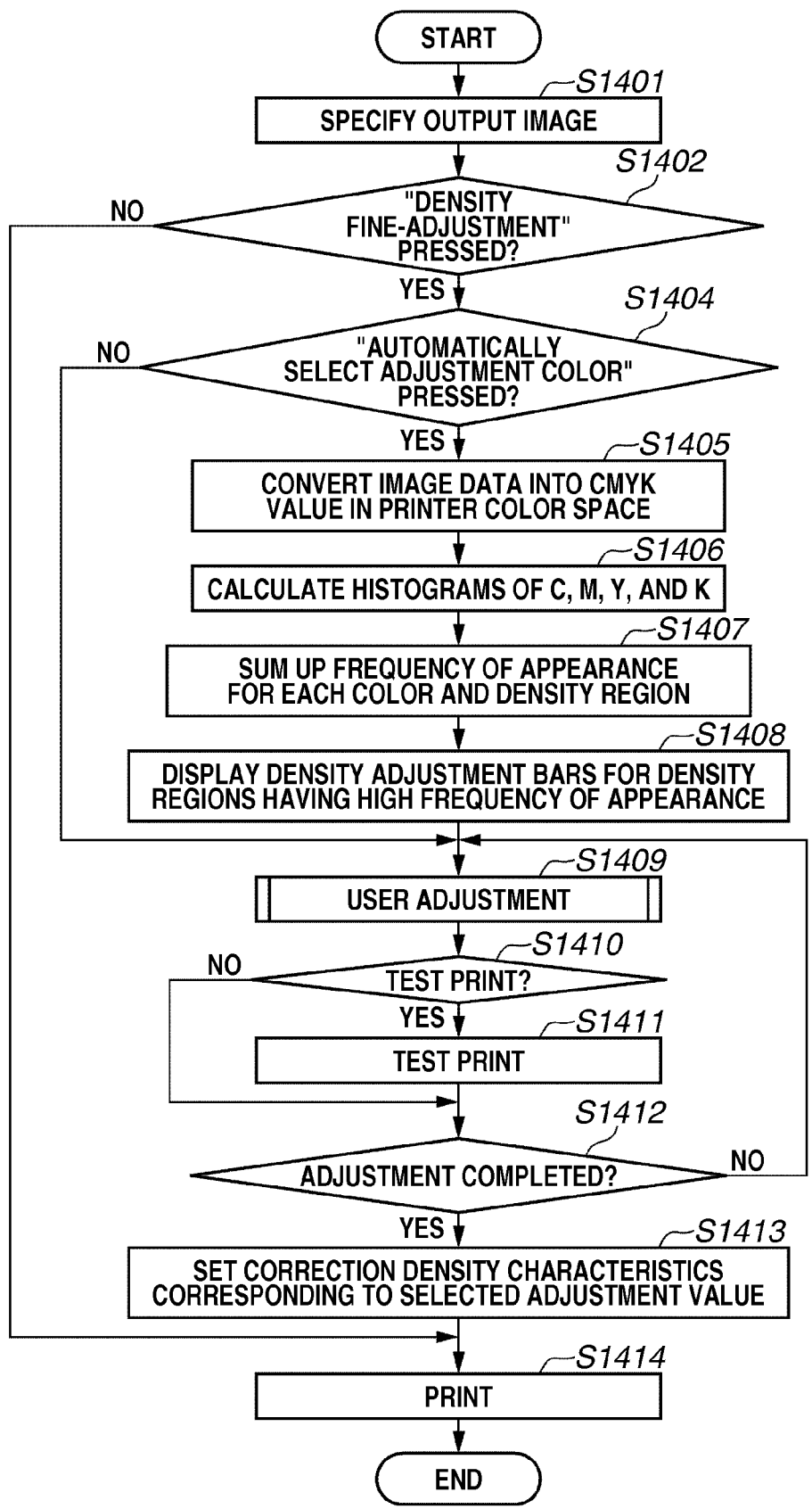
FIG. 14 is a flowchart illustrating main processing of density adjustment using a histogram based on image data according to a fifth exemplary embodiment.

Processing according to the present exemplary embodiment is illustrated in FIG. 14. Here, only processing in steps S1404 to S1408 will be described below which are different from the processing in the first exemplary embodiment in the flowchart illustrated in FIG. 11. The processing in steps S1401, S1402, and S1409 to S1414 illustrated in FIG. 14 are similar to that in steps S1101, S1102, and S1109 to S1114 in FIG. 11.

In step S1404, the computer 10 determines whether the user presses an "AUTOMATICALLY SELECT ADJUSTMENT COLOR" button 411 in a UI as illustrated in FIG. 4. If the user presses the "AUTOMATICALLY SELECT ADJUSTMENT COLOR" button 411 (YES in step S1404), the processing proceeds to step S1405. If the user does not press the "AUTOMATICALLY SELECT ADJUSTMENT COLOR" button 411 (NO in step S1404), the processing proceeds to step S1409 to perform user adjustment.

In step S1405, the computer 10 converts the image data to be printed into a CMYK image in the printer color space. The CMYK conversion in this step is performed in the printer color conversion 1702 in FIG. 17 as described above.

In step S1406, the computer 10 scans the entire CMYK image and calculates histograms for C, M, Y, and K. An example of a UI displayed on the monitor 106 in this case is illustrated in FIGS. 10A and 10B. FIG. 10A illustrates a print preview of the image data to be printed. FIG. 10B illustrates histograms of C, M, Y, and K. The UI illustrated in FIG. 10B includes tabs 1002, 1003, 1004, and 1005 for respective histograms of C, M, Y, and K. Each tab stores a graph 1001 having a horizontal axis assigned an input density signal value and a vertical axis assigned the frequency of appearance. The computer 10 may internally use the histograms illustrated in FIG. 10B without displaying them as an UI.

In step S1407, the computer 10 sums up the frequency of appearance of each color and density region based on the graph 1001. Then in step S1408, the computer 10 displays in the UI, as illustrated in FIG. 5, displaying output density adjustment bars for colors and density regions having high frequencies of appearance.

Processing in step S1409 and subsequent steps is similar to the processing in step S1109 and subsequent steps in FIG. 11, and thus duplicated descriptions will be omitted.

According to the present exemplary embodiment, when the user wants to adjust frequently used tint, for example, by viewing the entire image data, the output density adjustment bars for relevant tint are displayed to assist the user in performing adjustment.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-106411 filed May 11, 2011, which is hereby incorporated by reference herein in its entirety.

What is claimed is:

1. An image processing apparatus comprising:
a preview image display unit configured to display a print preview image corresponding to an image to be printed;
a position selection unit configured to allow a selection made by a user to select a position subjected to density adjustment on the print preview image displayed by the preview image display unit;
an acquisition unit configured to acquire color information of the position selected by the position selection unit;
a determination unit configured to determine, based on the color information acquired by the acquisition unit, second density regions corresponding to respective densities of cyan, magenta, yellow, and black constituting a color of the selected position, wherein each of the second density regions is one of density regions generated by dividing a first density region that is a density adjustable range of the image processing apparatus, and each of the generated density regions has a different density adjustable range; and
an adjustment screen display control unit configured to control to display an adjustment screen for adjusting the respective densities within the determined second density regions.

2. The image processing apparatus according to claim 1, further comprising a correction unit configured to correct a density of the image to be printed with use of an adjustment value input via the adjustment screen controlled to be displayed by the adjustment screen display control unit.

3. The image processing apparatus according to claim 1, wherein the adjustment screen controlled to be displayed by the adjustment screen display control unit includes vivid adjustment, brightness adjustment, or tint adjustment.

4. The image processing apparatus according to claim 3, wherein, if the vivid adjustment, the brightness adjustment, or the tint adjustment is specified, a value of the color of the selected position changes in association with the input adjustment value.

5. The image processing apparatus according to claim 1, wherein an adjustment value input via the adjustment screen controlled to be displayed by the adjustment screen display control unit is reflected and displayed on the print preview image.

6. The image processing apparatus according to claim 1, wherein, if the color information acquired by the acquisition unit is a predetermined memory color, the adjustment screen display control unit controls to display an adjustment screen for adjusting the predetermined memory color.

7. The image processing apparatus according to claim 1, wherein each of the second density regions determined by the determination unit is at least any one of a high density region, an intermediate density region, and a low density region.

8. The image processing apparatus according to claim 1, wherein, when a plurality of positions is selected by the position selection unit and the acquisition unit acquires a plurality of color information pieces, and as a result the determination unit determines second density regions respectively corresponding to the plurality of color information pieces, if the corresponding density regions coincide with each other, an instruction to perform density adjustment by prioritizing any one of the plurality of color information pieces or an instruction to perform density adjustment with use of an intermediate value of the plurality of color information pieces is input.

9. An image processing apparatus comprising:
a color selection unit configured to allow a selection made by a user to select a color to be adjusted with use of a color palette;
a determination unit configured to determine, based on the color selected using the color selection unit, second density regions corresponding to respective densities of cyan, magenta, yellow, and black constituting a color of a selected position, wherein each of the second density regions is one of density regions generated by dividing a first density region that is a density adjustable range of the image processing apparatus, and each of the generated density regions has a different density adjustable range; and
an adjustment screen display control unit configured to control to display an adjustment screen for adjusting the respective densities within the determined second density regions.

10. An image processing apparatus comprising:
a preview image display unit configured to display a print preview image corresponding to an image to be printed;
a position selection unit configured to allow a selection made by a user to select a position subjected to brightness adjustment on the print preview image displayed by the preview image display unit;
an acquisition unit configured to acquire color information of the position selected by the position selection unit;
a determination unit configured to determine, based on the color information acquired by the acquisition unit, second brightness regions corresponding to respective brightness of red, green, and blue constituting a color of the selected position, wherein each of the second brightness regions is one of brightness regions generated by dividing a first brightness region that is a brightness adjustable range of the image processing apparatus, and each of the generated brightness regions has a different brightness adjustable range; and
an adjustment screen display control unit configured to control to display an adjustment screen for adjusting the respective brightness within the determined second brightness regions.

11. A method for processing an image, the method comprising:

displaying a print preview image corresponding to an image to be printed;

allowing a selection made by a user to select a position subjected to density adjustment on the displayed print preview image;

acquiring color information of the selected position;

determining, based on the acquired color information, second density regions corresponding to respective densities of cyan, magenta, yellow, and black constituting a color of the selected position, wherein each of the second density regions is one of density regions generated by dividing a first density region that is a density adjustable range of the image processing apparatus, and each of the generated density regions has a different density adjustable range; and controlling to display an adjustment screen for adjusting the respective densities within the determined second density regions.

12. A method for processing an image, the method comprising:

causing a user to select a color to be adjusted with use of a color palette;

determining, based on the selected color, second density regions corresponding to respective densities of cyan, magenta, yellow, and black constituting a color of a selected position, wherein each of the second density regions is one of density regions generated by dividing a first density region that is a density adjustable range of the image processing apparatus, and each of the generated density regions has a different density adjustable range; and controlling to display an adjustment screen for adjusting the respective densities within the determined second density regions.

13. A method for processing an image, the method comprising:

displaying a print preview image corresponding to an image to be printed;

allowing a selection made by a user to select a position subjected to brightness adjustment on the displayed print preview image;

acquiring color information of the selected position;

determining, based on the acquired color information, second brightness regions corresponding to respective brightness of red, green, and blue constituting a color of the selected position, wherein each of the second brightness regions is one of brightness regions generated by dividing a first brightness region that is a brightness adjustable range of the image processing apparatus, and each of the generated brightness regions has a different brightness adjustable range; and controlling to display an adjustment screen for adjusting the respective brightness within the determined second brightness regions.

14. A non-transitory computer-readable medium for storing a computer-readable program to be executed by a computed provided in an image processing apparatus, the program comprising:

displaying a print preview image corresponding to an image to be printed;

allowing a selection made by a user to select a position subjected to density adjustment on the displayed print preview image;

acquiring color information of the selected position;

determining, based on the acquired color information, second density regions corresponding to respective densities of cyan, magenta, yellow, and black constituting a color of the selected position, wherein each of the second density regions is one of density regions generated by dividing a first density region that is a density adjustable range of the image processing apparatus, and each of the generated density regions has a different density adjustable range; and controlling to display an adjustment screen for adjusting the respective densities within the determined second density regions.

* * * * *